(12) United States Patent
Toyoda

(10) Patent No.: US 11,056,907 B2
(45) Date of Patent: Jul. 6, 2021

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 12 days.

(21) Appl. No.: 16/477,942

(22) PCT Filed: Feb. 3, 2017

(86) PCT No.: PCT/JP2017/003993
§ 371 (c)(1),
(2) Date: Jul. 15, 2019

(87) PCT Pub. No.: WO2018/142579
PCT Pub. Date: Aug. 9, 2018

(65) Prior Publication Data
US 2019/0363569 A1    Nov. 28, 2019

(51) Int. Cl.
*H02J 9/06* (2006.01)
*H02M 5/458* (2006.01)

(52) U.S. Cl.
CPC .............. *H02J 9/06* (2013.01); *H02J 9/061* (2013.01); *H02M 5/458* (2013.01)

(58) Field of Classification Search
CPC .. H02J 9/06; H02J 9/062; H02J 9/061; H02M 5/458; H02M 5/4585

(Continued)

(56) References Cited

U.S. PATENT DOCUMENTS 7,005,759 B2*  2/2006  Ying ............... H02J 9/061
                                              307/64
7,671,487 B2*  3/2010  Wang .............. H02J 9/062
                                              307/64

(Continued)

FOREIGN PATENT DOCUMENTS

CA    2 984 331 A1   12/2016
JP    2014-7929 A     1/2014

OTHER PUBLICATIONS

International Search Report dated Feb. 28, 2017 in PCT/JP2017/003993 filed Feb. 3, 2017.

(Continued)

*Primary Examiner* — Nguyen Tran
*Assistant Examiner* — Jagdeep S Dhillon
(74) *Attorney, Agent, or Firm* — Oblon, McClelland, Maier & Neustadt, L.L.P.

(57) ABSTRACT

In an uninterruptible power supply device for supplying DC power to a load, a control device is configured such that, when the load is performing power running operation, the control device turns on a second switch to supply DC power from a diode rectifier to the load, turns off a first switch, and controls a converter to suppress a harmonic current contained in an AC current flowing from an AC power supply to the diode rectifier, and when the load is performing regenerative operation, the control device turns off the second switch, turns on the first switch, and controls the converter to convert regenerative power generated by the load into AC power.

18 Claims, 15 Drawing Sheets

(58) Field of Classification Search
USPC .......................... 307/64, 66, 43, 82, 80, 65
See application file for complete search history.

(56) References Cited

U.S. PATENT DOCUMENTS

| | | | | |
|---|---|---|---|---|
| 7,786,616 | B2* | 8/2010 | Naden | H02J 3/28 |
| | | | | 307/64 |
| 8,946,931 | B2* | 2/2015 | Jayaraman | H02M 3/158 |
| | | | | 307/64 |
| 9,024,476 | B2* | 5/2015 | Ghosh | H02J 9/062 |
| | | | | 307/66 |
| 9,047,076 | B1 | 6/2015 | Lee | |
| 9,774,263 | B1* | 9/2017 | Chen | H02M 3/3378 |
| 2005/0122747 | A1* | 6/2005 | Gaksch | H02M 3/33592 |
| | | | | 363/24 |
| 2006/0238031 | A1* | 10/2006 | Frey | H02J 9/062 |
| | | | | 307/64 |
| 2008/0215302 | A1 | 9/2008 | Nasle et al. | |
| 2011/0133554 | A1* | 6/2011 | Rizet | H02M 1/34 |
| | | | | 307/64 |
| 2012/0236439 | A1* | 9/2012 | Nguyen | H02J 7/34 |
| | | | | 361/18 |
| 2013/0026835 | A1* | 1/2013 | Ghosh | H02M 1/10 |
| | | | | 307/66 |
| 2013/0320931 | A1* | 12/2013 | Yoshida | B60R 16/033 |
| | | | | 320/135 |
| 2014/0176100 | A1* | 6/2014 | Hara | H02M 5/293 |
| | | | | 323/282 |
| 2018/0262045 | A1* | 9/2018 | Ohnishi | H02M 7/537 |

OTHER PUBLICATIONS

Office Action dated Jun. 15, 2020 in Indian Patent Application No. 201917033936 (with English translation), 7 pages.

* cited by examiner

UNINTERRUPTIBLE POWER SUPPLY DEVICE

TECHNICAL FIELD

The present invention relates to an uninterruptible power supply device.

BACKGROUND ART

Generally, an uninterruptible power supply (UPS) device is configured to include a converter for converting alternating current (AC) power into direct current (DC) power, and an inverter for converting DC power into AC power, as described for example in Japanese Patent Laying-Open No. 2014-7929 (PTL 1). Further, a storage battery is connected to the uninterruptible power supply device described above, and DC power is supplied from the storage battery to the uninterruptible power supply device.

In the uninterruptible power supply device described above, the converter converts AC power from a commercial AC power supply into DC power. The inverter converts the DC power from the converter or the DC power from the storage battery into AC power having a fixed frequency and a fixed voltage, and supplies the converted AC power to an AC load.

Further, when an abnormality (such as a power failure or a momentary drop) occurs in the commercial AC power supply, the DC power is supplied from the storage battery to the inverter. Thereby, when an abnormality occurs in the commercial AC power supply, the uninterruptible power supply device uninterruptibly supplies the AC power to the AC load.

CITATION LIST

Patent Literature

PTL 1: Japanese Patent Laying-Open No. 2014-7929

SUMMARY OF INVENTION

Technical Problem

When power is supplied to a DC load using the uninterruptible power supply device described above, a configuration of converting the AC power generated by the inverter into DC power suitable for the DC load, using an AC adaptor provided outside the device, and supplying the converted DC power to the DC load is generally adopted. However, in the above configuration, a power loss occurs in each of the inverter and the AC adaptor, which may cause a reduction in efficiency.

In addition, when regenerative power is generated in the DC load, the uninterruptible power supply device needs a mechanism for collecting the regenerative power.

The present invention has been made to solve the aforementioned problems, and an object thereof is to provide an uninterruptible power supply device capable of supplying power to a DC load with a high efficiency, and capable of collecting regenerative power generated in the DC load.

Solution to Problem

According to an aspect of the present invention, an uninterruptible power supply device is configured to supply DC power to a load. The uninterruptible power supply device includes a DC bus connected to the load, a converter, a diode rectifier, a DC/DC converter, a first switch, a second switch, and a control device. The converter is connected between an AC power supply and the DC bus. The diode rectifier is connected between the AC power supply and the DC bus, in parallel to the converter. The DC/DC converter is configured to perform DC voltage conversion between the DC bus and a power storage device for storing DC power. The first switch is electrically connected between the converter and the DC bus. The second switch is electrically connected between the diode rectifier and the DC bus. The control device is configured to control the converter, the DC/DC converter, and the first and second switches. When the load is performing power running operation, the control device turns on the second switch to supply DC power from the diode rectifier to the load. The control device also turns off the first switch, and controls the converter to suppress a harmonic current contained in an AC current flowing from the AC power supply to the diode rectifier. When the load is performing regenerative operation, the control device turns off the second switch, turns on the first switch, and controls the converter to convert regenerative power generated by the load into AC power.

Advantageous Effects of Invention

According to the present invention, an uninterruptible power supply device capable of supplying power to a DC load with a high efficiency, and capable of collecting regenerative power generated in the DC load can be provided.

DESCRIPTION OF EMBODIMENTS

Figure 1:
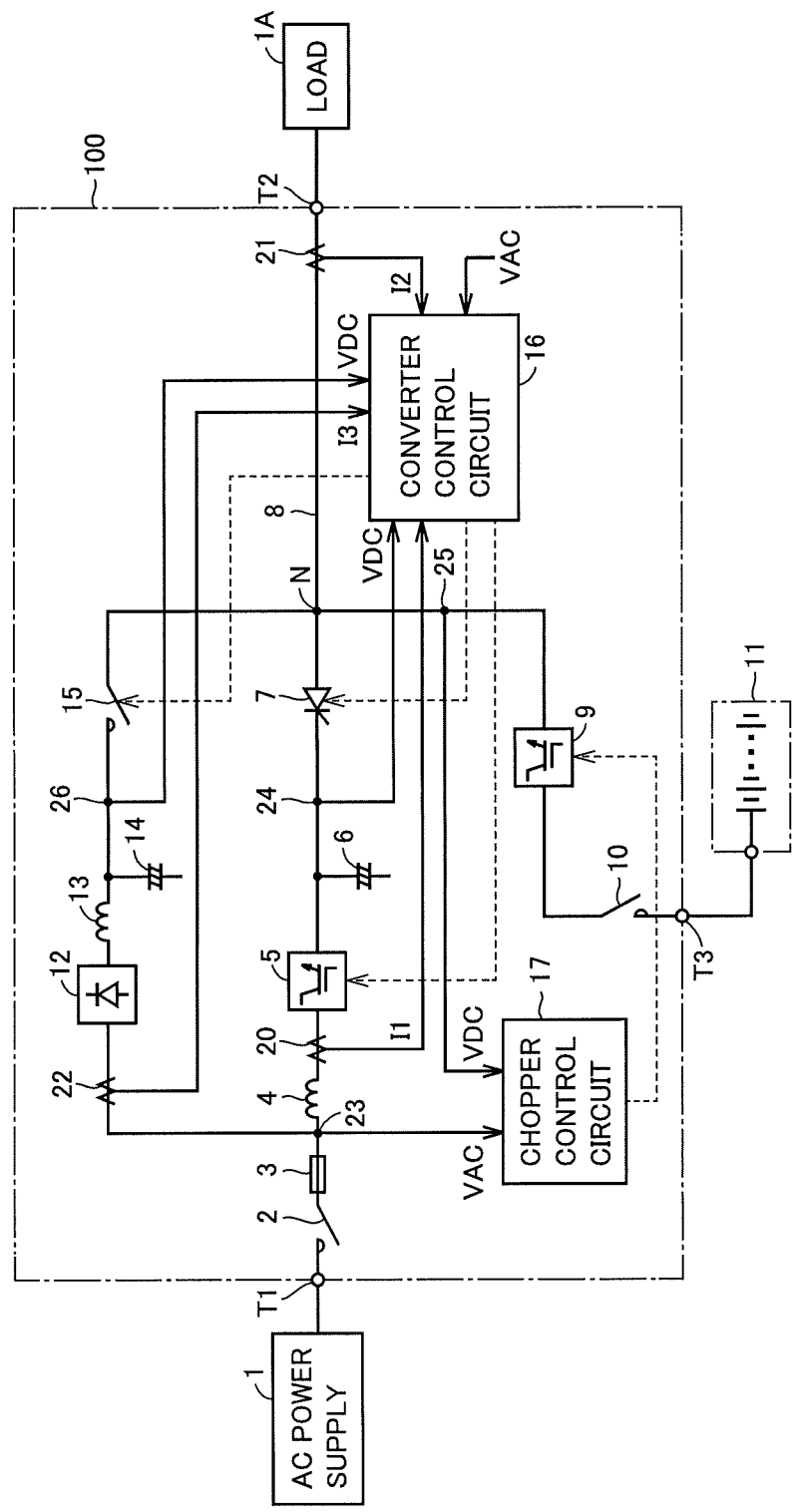
FIG. 1 is a circuit block diagram showing a configuration of an uninterruptible power supply device in accordance with a first embodiment of the present invention.

Hereinafter, embodiments of the present invention will be described in detail with reference to the drawings. It should be noted that identical or corresponding parts will be designated by the same reference numerals, and the description thereof will not be repeated.

First Embodiment

FIG. 1 is a circuit block diagram showing a configuration of an uninterruptible power supply device 100 in accordance with a first embodiment of the present invention. Referring to FIG. 1, uninterruptible power supply device 100 in accordance with the first embodiment is connected between an AC power supply 1 and a DC load 1A (hereinafter simply referred to as a load 1A), and is configured to supply DC power to load 1A.

AC power supply 1 is a commercial AC power supply, for example, and supplies AC power having a commercial frequency to uninterruptible power supply device 100. Although uninterruptible power supply device 100 actually receives three-phase AC power from AC power supply 1, FIG. 1 shows only a circuit for one phase, for simplification of the drawing and the description.

Load 1A is, for example, an electrical apparatus driven by DC power. Load 1A is driven by the DC power supplied from uninterruptible power supply device 100. Load 1A can alternately perform power running operation and regenerative operation.

Uninterruptible power supply device 100 includes an input terminal T1, an output terminal T2, and a battery terminal T3. Input terminal T1 receives the AC power supplied from AC power supply 1. Output terminal T2 is connected to load 1A. Load 1A can perform the power running operation using the DC power supplied from uninterruptible power supply device 100.

Battery terminal T3 is connected to a storage battery 11. Storage battery 11 is a battery in which DC power can be charged and from which DC power can be discharged. Storage battery 11 corresponds to one embodiment of a "power storage device" for storing DC power. Instead of storage battery 11, a capacitor (such as an electric double layer capacitor or an electrolytic capacitor) may be connected to battery terminal T3.

Uninterruptible power supply device 100 further includes switches 2, 7, 10, and 15, a fuse 3, reactors 4 and 13, a converter 5, capacitors 6 and 14, a DC bus 8, a diode rectifier 12, a bidirectional chopper 9, current detectors 20 to 22, voltage detectors 23 to 26, a converter control circuit 16, and a chopper control circuit 17. Switch 2, fuse 3, reactor 4, converter 5, switch 7, and DC bus 8 are connected in series between input terminal T1 and output terminal T2.

Switch 2 is connected between input terminal T1 and converter 5. Switch 2 is closed (turned on) in an ordinary state where the AC power is normally supplied from AC power supply 1, and is opened (turned off) during maintenance of uninterruptible power supply device 100, for example. Turning on/off of switch 2 is controlled by chopper control circuit 17.

Fuse 3 is inserted into an energizing path between input terminal T1 and converter 5 to prevent an overcurrent from flowing from AC power supply 1. Reactor 4 is provided to pass the AC power from AC power supply 1, and to prevent a signal having a switching frequency generated in converter 5 from propagating to AC power supply 1.

Converter 5 is configured to convert the AC power supplied from AC power supply 1 into DC power (conversion). The DC power generated in converter 5 is output to DC bus 8. On this occasion, converter 5 outputs a direct current to DC bus 8 such that a voltage VDC of DC bus 8 becomes equal to a predetermined reference voltage VDCR.

In addition, when regenerative power (DC power) generated in load 1A is supplied to converter 5 via DC bus 8, converter 5 can convert the regenerative power into AC power having the commercial frequency (inversion). Power conversion in converter 5 is controlled by converter control circuit 16.

Further, converter 5 can serve as an active filter for reducing a harmonic contained in an AC current I3 flowing from AC power supply 1 to diode rectifier 12.

Converter 5 is composed of semiconductor switching elements. As each semiconductor switching element, for example, an IGBT (Insulated Gate Bipolar Transistor) is applied. As a method for controlling the semiconductor switching elements, PWM (Pulse Width Modulation) control is applicable.

DC bus 8 is connected to output terminal T2, and is also connected to battery terminal T3 via bidirectional chopper 9 and switch 10. Capacitor 6 is connected to DC bus 8 to smooth voltage VDC of DC bus 8. Switch 10 is turned on during operation of uninterruptible power supply device 100, and is turned off during maintenance of storage battery 11 and uninterruptible power supply device 100. Turning on/off of switch 10 is controlled by chopper control circuit 17.

Bidirectional chopper 9 is configured to perform bidirectional DC voltage conversion (boost and buck). When the AC power is normally supplied from AC power supply 1, bidirectional chopper 9 stores the DC power generated by converter 5 in storage battery 11. On this occasion, bidirectional chopper 9 supplies a direct current to storage battery 11 such that a voltage between terminals of storage battery 11 (voltage at battery terminal T3) becomes equal to a target battery voltage.

In contrast, when an abnormality occurs in the AC power supplied from AC power supply 1 (for example, when a power failure occurs), bidirectional chopper 9 supplies the DC power in storage battery 11 to load 1A. On this occasion, a current is caused to flow from storage battery 11 to output terminal T2 via bidirectional chopper 9, such that voltage VDC of DC bus 8 becomes equal to reference voltage VDCR. DC voltage conversion in bidirectional chopper 9 is controlled by chopper control circuit 17. Bidirectional chopper 9 corresponds to one embodiment of a "DC/DC converter".

Diode rectifier 12 is electrically connected between input terminal T1 and output terminal T2, in parallel to converter 5. Specifically, diode rectifier 12 is connected between input terminal T1 and DC bus 8. Diode rectifier 12 is configured such that, when the AC power is normally supplied from AC power supply 1, diode rectifier 12 converts the AC power supplied from AC power supply 1 into DC power. An AC terminal of diode rectifier 12 is connected to one terminal of reactor 4.

Reactor 13 has one terminal connected to a DC terminal of diode rectifier 12, and the other terminal connected to a node N on DC bus 8. Capacitor 14 is connected to the other terminal of reactor 13. Reactor 13 and capacitor 14 constitute a filter for removing a harmonic component contained in the DC power output from diode rectifier 12.

Switch 7 is connected between a DC terminal of converter 5 and DC bus 8. Switch 7 has one terminal connected to the DC terminal of converter 5, and the other terminal connected to node N. Switch 7 is a semiconductor switch, and is, for example, a thyristor switch. An anode and a cathode of a thyristor are connected to node N and the DC terminal of converter 5, respectively. When switch 7 is turned on, a current flows from node N toward converter 5 by the rectifying action of the thyristor. As described later, switch 7 is turned off during the power running operation of load 1A, and is turned on during the regenerative operation of load 1A. Turning on/off of switch 7 is controlled by converter control circuit 16. Switch 7 corresponds to one embodiment of a "first switch".

Switch 15 is connected between the DC terminal of diode rectifier 12 and DC bus 8. Switch 15 has one terminal connected to the other terminal of reactor 13, and the other terminal connected to node N. Switch 15 is a mechanical switch such as a contactor. As described later, switch 15 is turned on during the power running operation of load 1A, and is turned off during the regenerative operation of load 1A. Turning on/off of switch 15 is controlled by converter control circuit 16. Switch 15 corresponds to one embodiment of a "second switch".

Current detector 20 detects an AC current I1 flowing from AC power supply 1 to converter 5, and provides a signal indicating a detection value to converter control circuit 16. Current detector 21 detects a DC current I2 flowing to load 1A (hereinafter also referred to as a load current I2), and provides a signal indicating a detection value to converter control circuit 16. Current detector 22 detects AC current I3 flowing from AC power supply 1 to diode rectifier 12, and provides a signal indicating a detection value to converter control circuit 16.

Voltage detector 23 detects a voltage VAC of AC power supply 1 (hereinafter also referred to as an AC power supply voltage VAC), and provides a signal indicating a detection value to chopper control circuit 17 and converter control circuit 16. Voltage detector 24 detects voltage VDC of DC bus 8 when switch 7 is turned on, and provides a detection value to converter control circuit 16. Voltage detector 25 detects voltage VDC of DC bus 8, and provides a signal indicating a detection value to chopper control circuit 17. Voltage detector 26 detects voltage VDC of DC bus 8 when switch 15 is turned on, and provides a detection value to converter control circuit 16.

Converter control circuit 16 controls turning on/off of switches 7 and 15 and converter 5 based on output signals of current detectors 20 and 21 and voltage detectors 23, 24, and 26. Specifically, converter control circuit 16 determines whether load 1A is performing the power running operation or the regenerative operation based on voltage VDC of DC bus 8, and controls turning on/off of switches 7 and 15 and converter 5 based on the result of determination. A control configuration of converter control circuit 16 will be described later.

Chopper control circuit 17 controls bidirectional chopper 9 based on output signals of voltage detectors 23 and 25. Chopper control circuit 17 controls bidirectional chopper 9 such that voltage VDC of DC bus 8 becomes equal to reference voltage VDCR, and controls bidirectional chopper 9 such that the voltage between the terminals of storage battery 11 becomes less than or equal to an upper limit voltage. Converter control circuit 16 and chopper control circuit 17 correspond to one embodiment of a "control device".

Next, operation of uninterruptible power supply device 100 in accordance with the first embodiment will be described. First, operation when load 1A is performing the power running operation will be described with reference to FIGS. 2 and 3.

Figure 2:
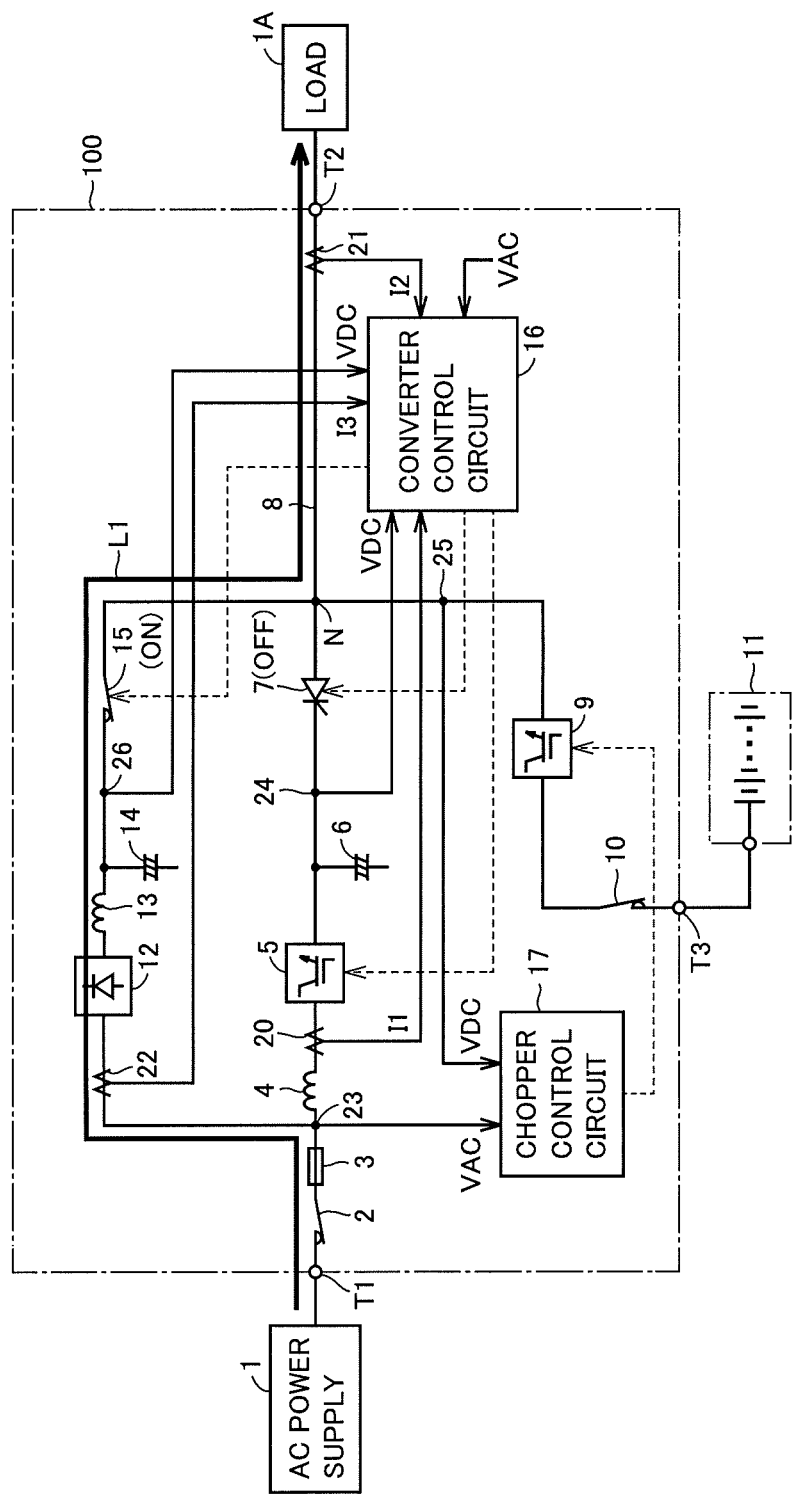
FIG. 2 is a view showing a flow of power when AC power is normally supplied from an AC power supply.

FIG. 2 is a view showing a flow of power when the AC power is normally supplied from AC power supply 1. In FIG. 2, the flow of power is indicated by an arrow L1.

In this case, in uninterruptible power supply device 100, switch 15 is turned on to electrically connect diode rectifier 12 to output terminal T2. On the other hand, switch 7 is turned off to electrically disconnect converter 5 from output terminal T2. Thereby, the AC power supplied from AC power supply 1 is converted into DC power by diode rectifier 12. The DC power generated by diode rectifier 12 passes through the filter constituted of reactor 13 and capacitor 14, switch 15, and DC bus 8, and is supplied from output terminal T2 to load 1A.

It should be noted that, when the voltage between the terminals of storage battery 11 is less than a voltage corresponding to a predetermined fully charged state, the DC power generated by diode rectifier 12 is supplied to load 1A, and is also supplied to storage battery 11 by bidirectional chopper 9. Thereby, storage battery 11 is charged to the predetermined fully charged state, and thereafter enters a standby state.

As described above, converter 5 is configured to convert the AC power supplied from AC power supply 1 into DC power (conversion). Therefore, uninterruptible power supply device 100 can also supply DC power to load 1A using converter 5. However, during execution of conversion, a power loss (conduction loss, switching loss) occurs in converter 5 due to turning on/off of the semiconductor switching elements. The power loss occurring in converter 5 causes a reduction in the efficiency of uninterruptible power supply device 100.

In contrast, a power loss in diode rectifier 12 is smaller than that in converter 5, because turning on/off of semiconductor switching elements is not performed. Uninterruptible power supply device 100 in accordance with the first embodiment can achieve a high efficiency by supplying DC power to load 1A using diode rectifier 12.

On the other hand, however, a harmonic is contained in a large quantity in current I3 flowing on an AC side of diode rectifier 12. Due to this harmonic current and power supply impedance, a harmonic voltage is generated, and a voltage waveform is distorted. This may exert influence, such as vibration, damage, and malfunction, on another facility or apparatus connected to AC power supply 1. In addition, in a capacitor input-type rectifier such as diode rectifier 12, an AC current has a narrow conduction angle and a large current flows momentarily, which may cause a reduction in power factor.

Here, during operation of diode rectifier 12, a DC side of converter 5 is electrically disconnected from DC bus 8 by turning off switch 7. In the first embodiment, by causing converter 5 to serve as an active filter, the harmonic can be suppressed, and the power factor can be improved.

Specifically, converter 5 is connected to the AC side of diode rectifier 12, which is a harmonic generation load. Converter 5 is regarded as a current source which can generate a current having an arbitrary waveform. Converter control circuit 16 extracts a harmonic current from current I3, generates a harmonic compensation current having a phase opposite to that of the extracted harmonic current in converter 5, and injects the harmonic compensation current into a point connected to AC power supply 1. Thereby, the harmonic current is offset by the harmonic compensation current, and current I3 can become a sinusoidal wave containing no harmonic. Therefore, the influence on another facility or apparatus connected to AC power supply 1 can be reduced.

Figure 3:
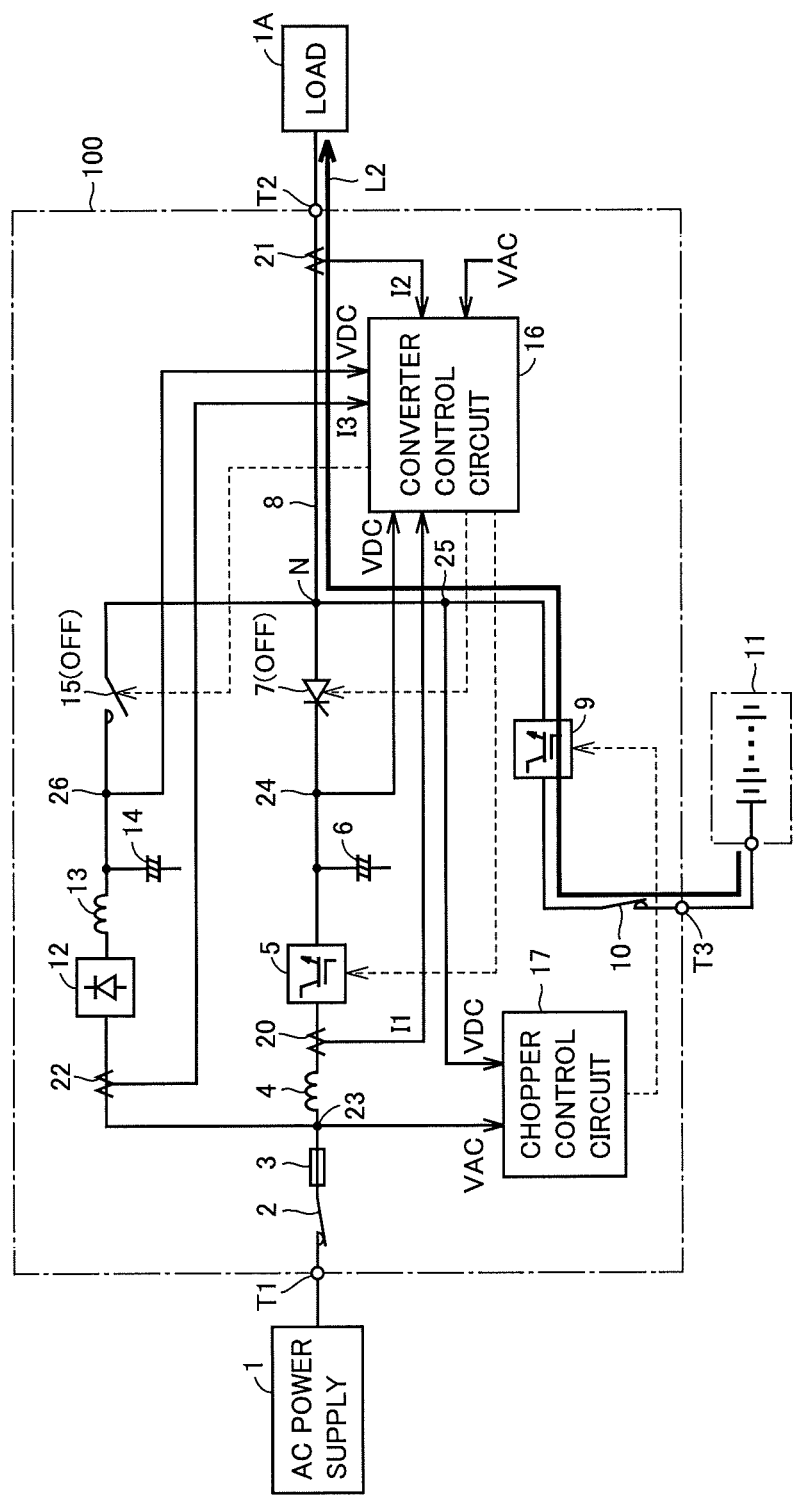
FIG. 3 is a view showing a flow of power when an abnormality occurs in the AC power supplied from the AC power supply.

FIG. 3 is a view showing a flow of power when an abnormality occurs in the AC power supplied from AC power supply 1. In FIG. 3, the flow of power is indicated by an arrow L2.

When AC power supply 1 has a power failure, in uninterruptible power supply device 100, switch 15 is turned off to electrically disconnect diode rectifier 12 from output terminal T2. Further, switch 7 is turned off to electrically disconnect converter 5 from output terminal T2.

In this case, the DC power in storage battery 11 is supplied to load 1A by bidirectional chopper 9. Chopper control circuit 17 controls bidirectional chopper 9 based on the output signal of voltage detector 25 and the voltage between the terminals of storage battery 11. Bidirectional chopper 9 boosts the voltage between the terminals of storage battery 11 and supplies it to DC bus 8. Chopper control circuit 17 controls bidirectional chopper 9 such that voltage VDC of DC bus 8 becomes equal to reference voltage VDCR.

It should be noted that, when the voltage between the terminals of storage battery 11 becomes equal to a predetermined lower limit voltage, discharging of storage battery 11 is stopped to prevent overdischarging of storage battery 11.

Here, when load 1A performs the regenerative operation, regenerative power is generated in load 1A, and the regenerative power flows from load 1A into output terminal T2. Thereby, voltage VDC of DC bus 8 increases. When converter control circuit 16 determines that load 1A is performing the regenerative operation based on the output signal of voltage detector 26, converter control circuit 16 returns the regenerative power to AC power supply 1 to collect the regenerative power.

Figure 4:
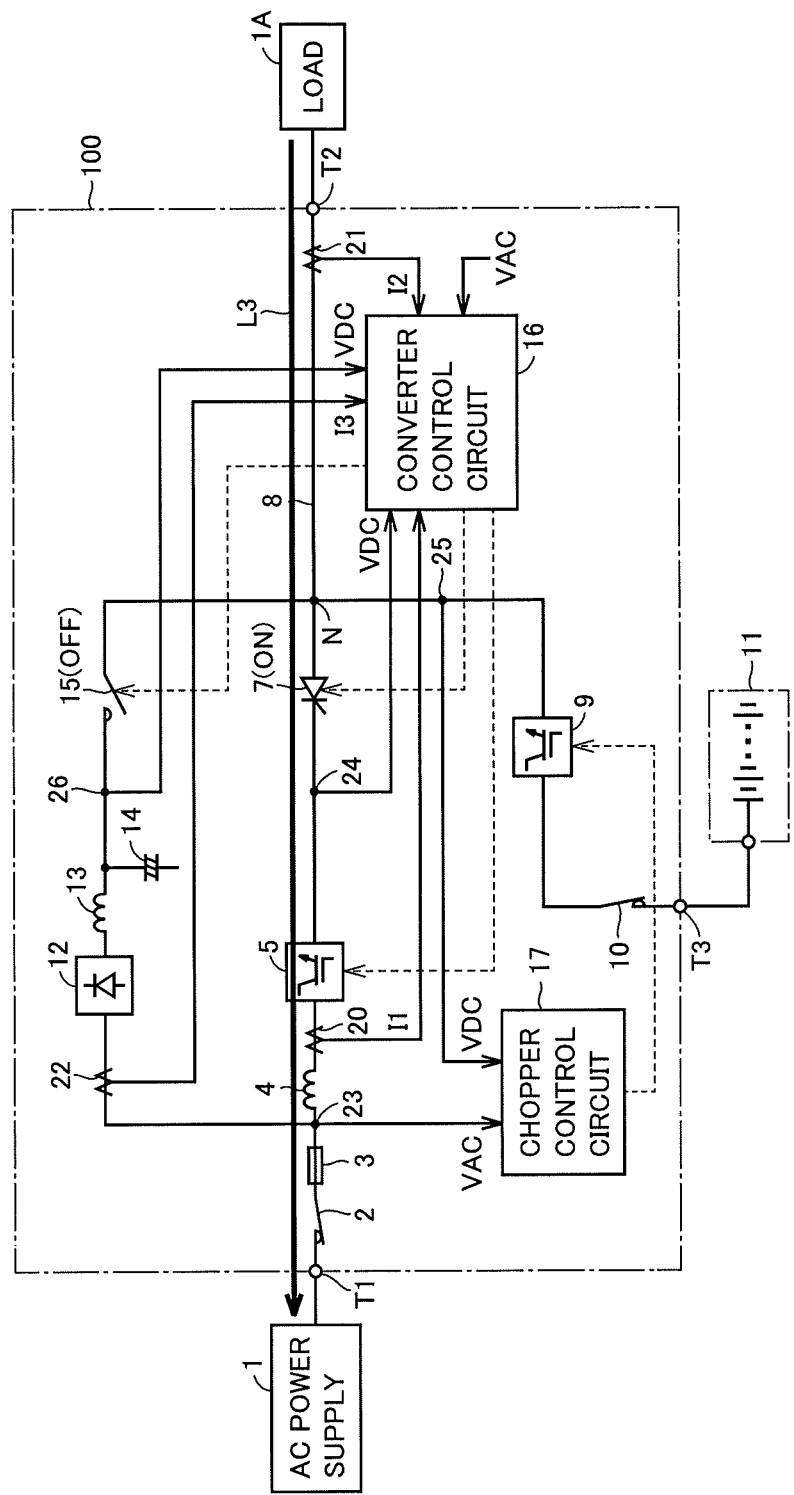
FIG. 4 is a view showing a flow of regenerative power generated in a load.

FIG. 4 is a view showing a flow of the regenerative power generated in load 1A. In FIG. 4, the flow of the regenerative power is indicated by an arrow L3.

In uninterruptible power supply device 100, switch 15 is turned off to electrically disconnect diode rectifier 12 from output terminal T2. On the other hand, switch 7 is turned on to electrically connect converter 5 to output terminal T2. By the rectifying action of switch 7, the regenerative power generated in load 1A is supplied to converter 5. Converter 5 converts the regenerative power into AC power having a commercial frequency. Thereby, the regenerative power is returned to AC power supply 1. Converter control circuit 16 controls converter 5 such that voltage VDC of DC bus 8 becomes equal to reference voltage VDCR.

As described above, during the power running operation of load 1A, converter control circuit 16 uses converter 5 as an active filter. On the other hand, during the regenerative operation of load 1A, converter control circuit 16 can return the regenerative power to AC power supply 1 using converter 5.

Figure 5:
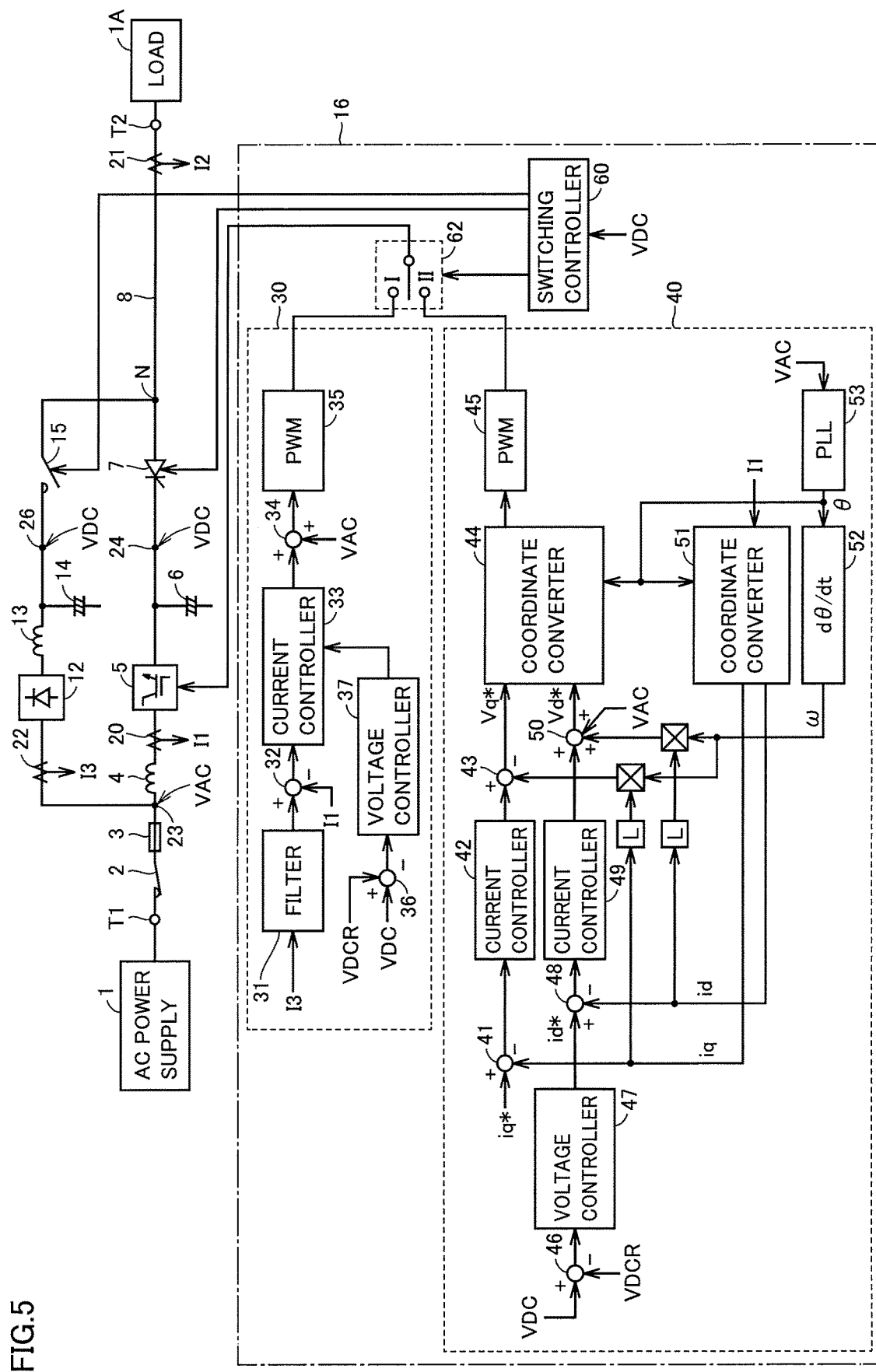
FIG. 5 is a circuit block diagram showing a configuration of a converter control circuit.

FIG. 5 is a circuit block diagram showing a configuration of converter control circuit 16. Referring to FIG. 5, converter control circuit 16 includes a harmonic controller 30, a power conversion controller 40, a switching controller 60, and a switching circuit 62.

Harmonic controller 30 is configured to generate a control signal for controlling converter 5 to generate the harmonic compensation current. Harmonic controller 30 includes a filter 31, subtractors 32 and 36, a current controller 33, a voltage controller 37, an adder 34, and a PWM controller 35.

Filter 31 divides AC current I3 detected by current detector 22 into a fundamental wave current and a harmonic current. Filter 31 extracts the harmonic current and outputs it to subtractor 32. That is, filter 31 removes the fundamental wave current from AC current I3.

Subtractor 32 subtracts the harmonic current extracted by filter 31 from the detection value of AC current I1 flowing to converter 5, and provides a signal indicating a subtraction result ΔI to current controller 33.

Subtractor 36 subtracts reference voltage VDCR from the detection value of voltage VDC of DC bus 8, and provides a signal indicating a subtraction result VDC-VDCR to voltage controller 37. Voltage controller 37 generates a current command value for setting VDC-VDCR to 0, and provides the current command value to current controller 33.

Current controller 33 generates a voltage command value based on subtraction result ΔI and the current command value, and provides the voltage command value to adder 34. Adder 34 adds AC voltage VAC detected by voltage detector 23 and the voltage command value, and generates a voltage command value.

Upon receiving the voltage command value from adder 34, PWM controller 35 compares the voltage command value with a triangular wave carrier signal to generate a control signal for turning on/off the semiconductor switching elements of converter 5. The control signal generated by PWM controller 35 is provided to a first input terminal I of switching circuit 62.

Power conversion controller 40 is configured to generate a control signal for controlling converter 5 to convert the regenerative power generated in load 1A into AC power. Power conversion controller 40 includes subtractors 41, 43, 46, and 48, a voltage controller 47, current controllers 42 and 49, an adder 50, coordinate converters 44 and 51, a computing unit 52, a PLL unit 53, and a PWM controller 45.

Subtractor 46 subtracts reference voltage VDCR from the detection value of voltage VDC of DC bus 8, and provides a signal indicating a subtraction result VDC-VDCR to voltage controller 47. Voltage controller 47 generates a current command value for setting VDC-VDCR to 0, and provides the current command value to subtractor 48, as an active current command value (a d-axis current command value) id*.

Subtractor 41 is provided with a reactive current command value (a q-axis current command value) iq*. When iq* is set to 0 and a q-axis current iq is controlled to be 0, only a d-axis current flows, and thus an AC input current can be a sinusoidal current having the same phase as that of AC power supply voltage VAC. That is, an input power factor of uninterruptible power supply device 100 can be controlled to 1.0.

PLL unit 53 detects a phase θ of AC power supply voltage VAC. In the present embodiment, it is assumed that the AC power supply voltage is detected as a d-axis component. Computing unit 52 calculates an angular frequency ω of AC power supply 1 from phase θ.

Coordinate converter 51 converts three-phase AC current I1 detected by current detector 20 into a d-axis current id and q-axis current iq, through coordinate conversion (three-phase to two-phase conversion) using phase θ. D-axis current id corresponds to an active current of the three-phase AC current, and q-axis current iq corresponds to a reactive current of the three-phase AC current. D-axis current id and q-axis current iq are provided to subtractors 48 and 41, respectively.

Subtractor 41 subtracts q-axis current iq from q-axis current command value iq* (for example, iq* is set to 0), and provides a signal indicating a subtraction result iq*−iq to current controller 42. Current controller 42 generates a q-axis voltage command value for setting iq*−iq to 0, and provides the q-axis voltage command value to subtractor 43. Subtractor 43 subtracts ωidL from the q-axis voltage command value, and provides a subtraction result to coordinate converter 44, as a q-axis voltage command value Vq*.

Subtractor 48 subtracts d-axis current id from d-axis current command value id*, and provides a signal indicating a subtraction result id*−id to current controller 49. Current controller 49 generates a voltage command value for setting id*−id to 0, and provides the voltage command value to adder 50. Adder 50 adds ωiqL and AC power supply voltage VAC to the d-axis voltage command value, and provides an addition result to coordinate converter 44, as a d-axis voltage command value Vd*.

Coordinate converter 44 converts d-axis voltage command value Vd* and q-axis voltage command value Vq* into three-phase voltage command values Vu*, Vv*, and Vw*, through coordinate conversion (two-phase to three-phase conversion) using phase θ. Upon receiving the three-phase voltage command values from coordinate converter 44, PWM controller 45 compares the three-phase voltage command values with a triangular wave carrier signal to generate a control signal for turning on/off the semiconductor switching elements of converter 5. The control signal generated by PWM controller 45 is provided to a second input terminal II of switching circuit 62.

Switching circuit 62 receives the control signal generated by harmonic controller 30 at first input terminal I, and receives the control signal generated by power conversion controller 40 at second input terminal II. According to an instruction from switching controller 60, switching circuit 62 selects one of these two control signals, and outputs it to converter 5.

Switching controller 60 determines whether load 1A is performing the power running operation or the regenerative operation based on voltage VDC of DC bus 8 detected by voltage detectors 24 and 26. Specifically, when switch 15 is turned on and switch 7 is turned off, the detection value of voltage detector 24 is 0 V, and thus switching controller 60 determines whether load 1A is performing the power running operation or the regenerative operation based on the detection value of voltage detector 26. On the other hand, when switch 7 is turned on and switch 15 is turned off, the detection value of voltage detector 26 is 0 V, and thus switching controller 60 determines whether load 1A is performing the power running operation or the regenerative operation based on the detection value of voltage detector 24.

When voltage VDC is less than or equal to a predetermined upper limit voltage VDCH (>VDCR), switching controller 60 determines that load 1A is performing the power running operation. On the other hand, when voltage VDC is higher than upper limit voltage VDCH, switching controller 60 determines that load 1A is performing the regenerative operation.

When switching controller 60 determines that load 1A is performing the power running operation, switching controller 60 turns on switch 15 and turns off switch 7. Thereby, diode rectifier 12 is electrically connected between AC power supply 1 and load 1A, and thus the DC power generated by diode rectifier 12 is supplied to load 1A. On this occasion, switching controller 60 instructs switching circuit 62 to output the control signal generated by harmonic controller 30. Thereby, converter 5 serves as an active filter, and thus the power factor can be improved, and the harmonic contained in the AC input current can be suppressed.

In contrast, when switching controller 60 determines that load 1A is performing the regenerative operation, switching controller 60 turns on switch 7 and turns off switch 15. Thereby, converter 5 is electrically connected between AC power supply 1 and load 1A, and thus the regenerative power generated in load 1A can be supplied to converter 5. On this occasion, switching controller 60 instructs switching circuit 62 to output the control signal generated by power conversion controller 40. Thereby, the regenerative power can be converted into AC power by converter 5, and can be returned to AC power supply 1.

Figure 6:
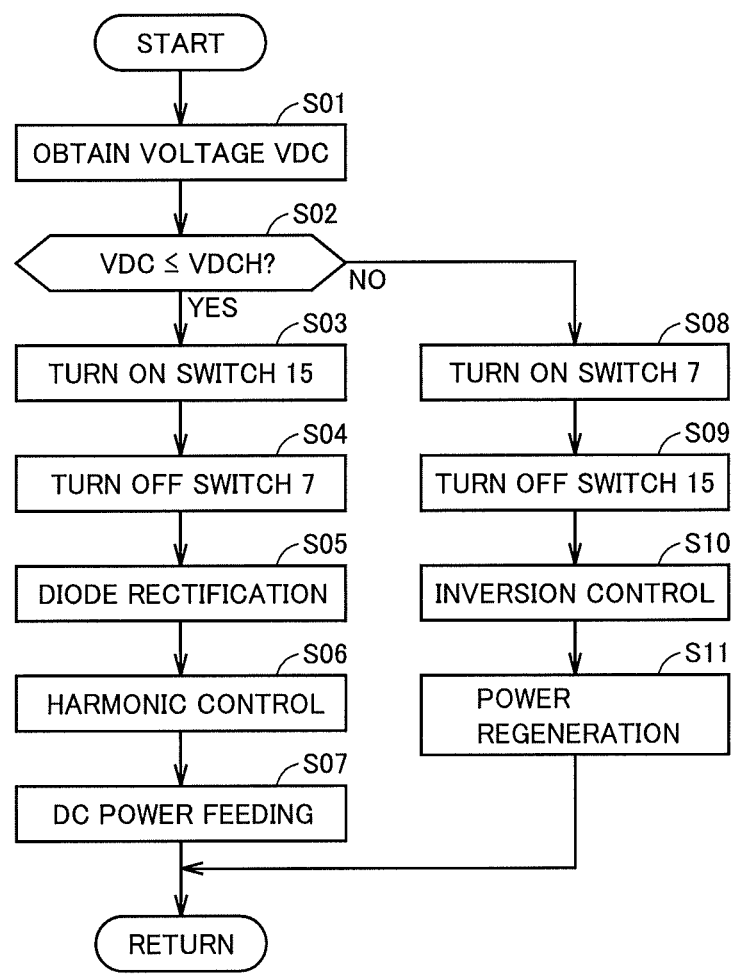
FIG. 6 is a flowchart for illustrating control performed by the converter control circuit.

FIG. 6 is a flowchart for illustrating control performed by converter control circuit 16 shown in FIG. 1. Processing in the flowchart in FIG. 6 and those in the subsequent drawings is invoked from a main routine and performed at regular time intervals or whenever predetermined conditions are satisfied.

Referring to FIG. 6, in step S01, converter control circuit 16 obtains voltage VDC of DC bus 8 based on the output signals of voltage detectors 24 and 26. In step S02, converter control circuit 16 determines whether load 1A is performing the power running operation or the regenerative operation based on voltage VDC.

In the case of VDC≤VDCH (YES in S02), converter control circuit 16 determines that load 1A is performing the power running operation. In this case, converter control circuit 16 turns on switch 15 in step S03, and turns off switch 7 in step S04.

In step S05, the AC power supplied from AC power supply 1 is converted into DC power by diode rectifier 12. In step S06, converter control circuit 16 instructs switching circuit 62 (FIG. 5) to output the control signal generated by harmonic controller 30. Thereby, in step S07, the DC power generated by diode rectifier 12 is supplied to load 1A. On the AC side of diode rectifier 12, the harmonic is suppressed and the power factor is improved by converter 5.

In contrast, in the case of VDC>VDCH (NO in S02), converter control circuit 16 determines that load 1A is performing the regenerative operation. In this case, converter control circuit 16 turns on switch 7 in step S08, and turns off switch 15 in step S09.

In step S10, converter control circuit 16 instructs switching circuit 62 to output the control signal generated by power conversion controller 40. As a result, in step S11, the regenerative power generated in load 1A is converted into AC power by converter 5, and is returned to AC power supply 1.

As described above, the uninterruptible power supply device in accordance with the first embodiment allows DC power to be supplied to the load with a high efficiency, while taking a measure against the harmonic. Further, the uninterruptible power supply device allows the regenerative power generated in the load to be collected in the AC power supply.

Second Embodiment

Figure 7:
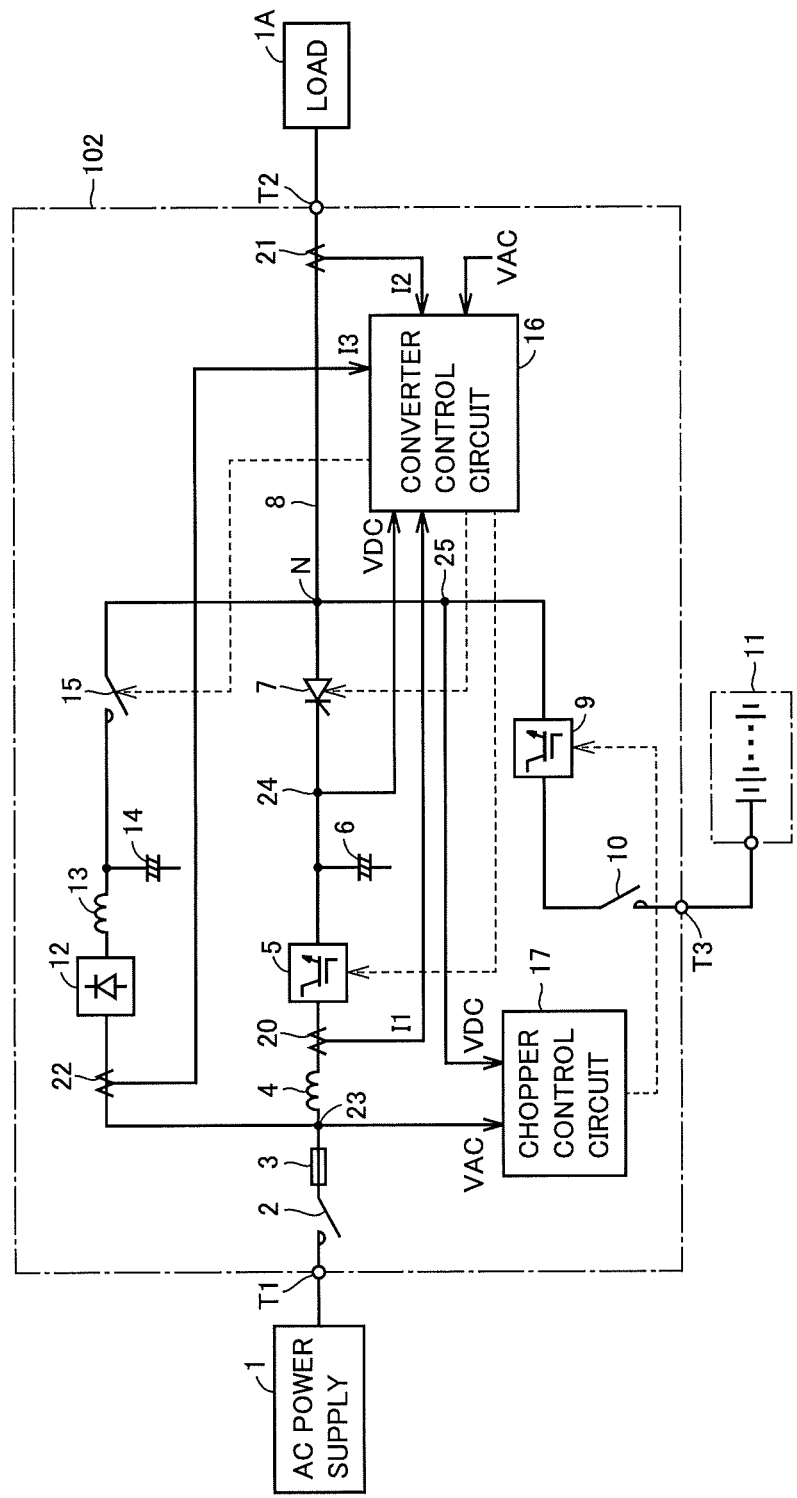
FIG. 7 is a circuit block diagram showing a configuration of an uninterruptible power supply device in accordance with a second embodiment of the present invention.

FIG. 7 is a circuit block diagram showing a configuration of an uninterruptible power supply device 102 in accordance with a second embodiment of the present invention. Referring to FIG. 7, uninterruptible power supply device 102 in accordance with the second embodiment is different from uninterruptible power supply device 100 in accordance with the first embodiment shown in FIG. 1 in that uninterruptible power supply device 102 does not include voltage detector 26.

In uninterruptible power supply device 102 in accordance with the second embodiment, converter control circuit 16 is configured to determine whether load 1A is performing the power running operation or the regenerative operation based on the detection value of current detector 21.

Specifically, when load current I2 obtained from the detection value of current detector 21 has a positive value (that is, when load current I2 is flowing into load 1A), converter control circuit 16 determines that load 1A is performing the power running operation. On the other hand, when load current I2 has a negative value (that is, when load current I2 is flowing out of load 1A), converter control circuit 16 determines that load 1A is performing the regenerative operation. Converter control circuit 16 controls turning on/off of switches 7 and 15 and converter 5 based on the result of determination.

Figure 8:
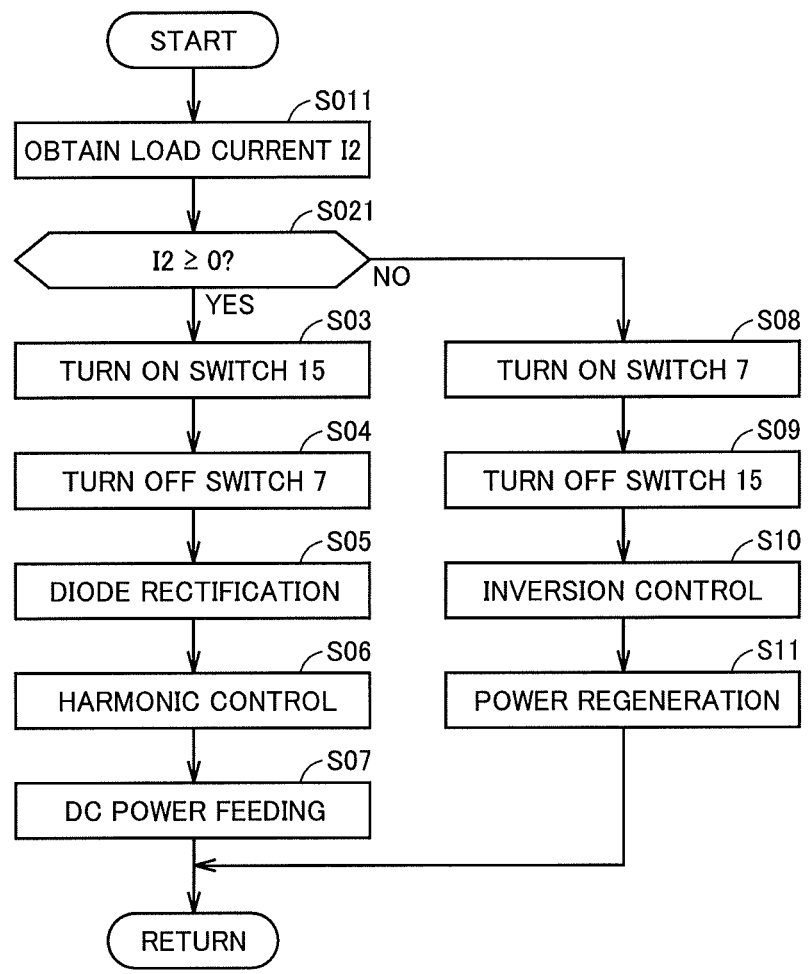
FIG. 8 is a flowchart for illustrating control performed by a converter control circuit.

FIG. 8 is a flowchart for illustrating control performed by converter control circuit 16 shown in FIG. 7. The flowchart shown in FIG. 8 includes processing in steps S011 and S021, instead of the processing in steps S01 and S02 in the flowchart shown in FIG. 6.

Referring to FIG. 8, in step S011, converter control circuit 16 obtains load current I2 based on the detection value of current detector 21. In step S021, converter control circuit 16 determines whether load 1A is performing the power running operation or the regenerative operation based on load current I2.

In the case of I2≥0 (YES in S021), converter control circuit 16 determines that load 1A is performing the power running operation. In this case, converter control circuit 16 performs processing in steps S03 to S07 identical to those in FIG. 6, to supply the DC power to load 1A using diode rectifier 12, and suppress the harmonic contained in the AC input current and improve the power factor using converter 5.

In contrast, in the case of I2<0 (NO in S021), converter control circuit 16 determines that load 1A is performing the regenerative operation. In this case, converter control circuit 16 performs processing in steps S08 to S11 identical to those in FIG. 6, to return the regenerative power generated in load 1A to AC power supply 1 using converter 5.

As described above, the uninterruptible power supply device in accordance with the second embodiment can achieve the same effect as that of the uninterruptible power supply device in accordance with the first embodiment.

Third Embodiment

Figure 9:
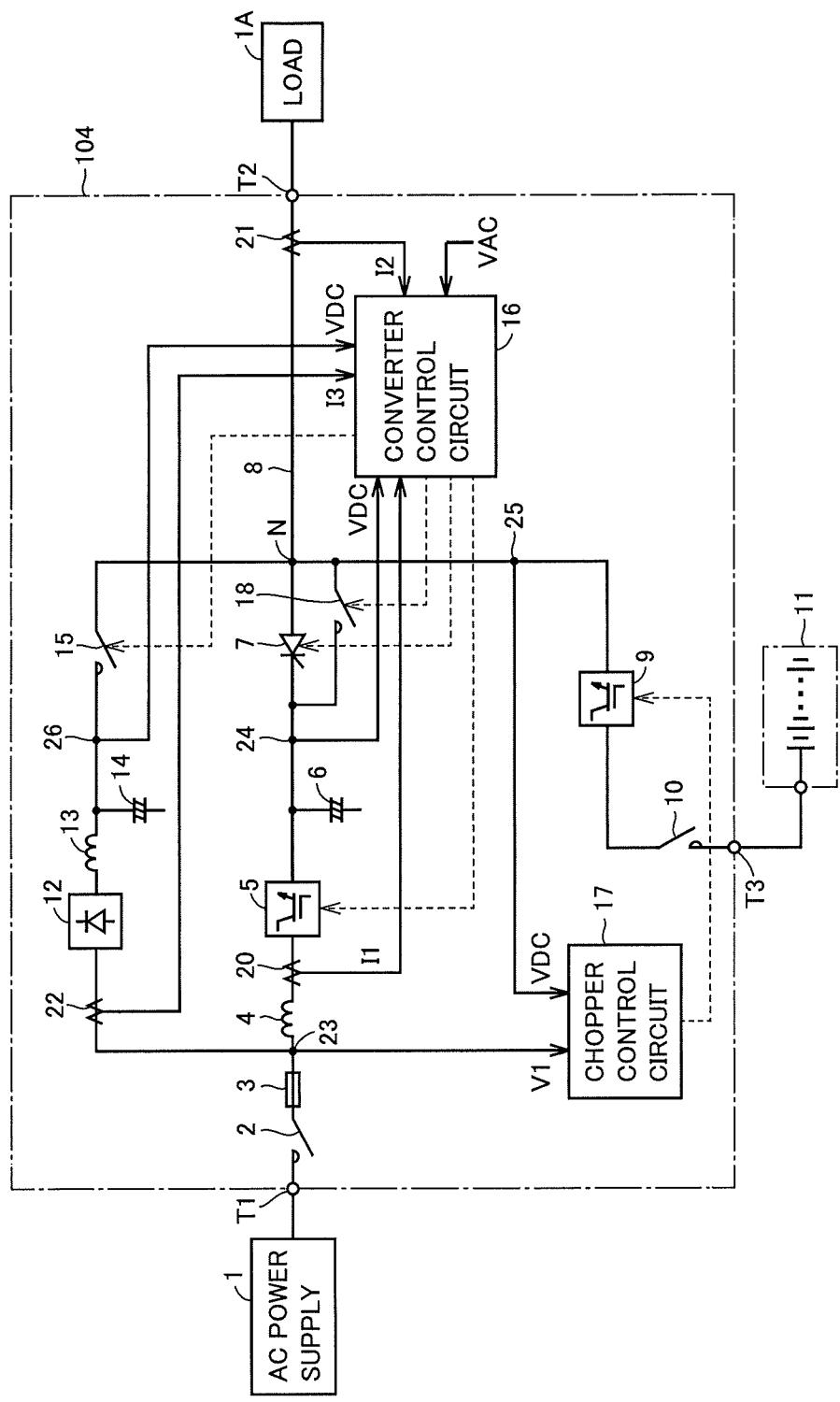
FIG. 9 is a circuit block diagram showing a configuration of an uninterruptible power supply device in accordance with a third embodiment of the present invention.

FIG. 9 is a circuit block diagram showing a configuration of an uninterruptible power supply device 104 in accordance with a third embodiment of the present invention. Referring to FIG. 9, uninterruptible power supply device 104 in accordance with the third embodiment is different from uninterruptible power supply device 100 in accordance with the first embodiment shown in FIG. 1 in that uninterruptible power supply device 104 additionally includes a switch 18.

Switch 18 is connected in parallel to switch 7, which is a semiconductor switch. Switch 18 is a mechanical switch such as a contactor, for example. Turning on/off of switch 18 is controlled by converter control circuit 16. A parallel circuit including switches 7 and 18 corresponds to one embodiment of the "first switch".

In uninterruptible power supply device 104 in accordance with the third embodiment, when load 1A is performing the power running operation, switch 15 is turned on to electrically connect diode rectifier 12 to output terminal T2, whereas both switches 7 and 18 are turned off to electrically disconnect converter 5 from output terminal T2.

When load 1A switches from the power running operation to the regenerative operation, converter control circuit 16 turns on switch 7 and turns off switch 15. Thereby, converter 5 is electrically connected to output terminal T2 via switch 7.

Converter control circuit 16 has a timer for measuring a time for which load 1A is performing the regenerative operation (hereinafter also referred to as a regenerative operation time). Converter control circuit 16 activates the timer at a time point when load 1A switches to the regenerative operation, to start measurement of the regenerative operation time. When load 1A switches from the regenerative operation to the power running operation, converter control circuit 16 sets a count value CNT of the timer to an initial value (CNT=0).

When count value CNT of the timer reaches a set value, that is, when the regenerative operation time reaches a set time, converter control circuit 16 further turns on switch 18, and turns off switch 7. By turning off switch 7, the regenerative power is supplied to converter 5 via switch 18.

In a semiconductor switch, passage of a large current causes a large loss. On the other hand, in a mechanical switch, current passage rarely causes a loss. Accordingly, although switch 7 (semiconductor switch) can perform uninterruptible switching, switch 7 has a disadvantage that a large loss is caused by current passage, when compared with switch 18 (mechanical switch). Thus, if switch 7 is kept turned on during the regenerative operation, switch 7 may be damaged by the loss. It should be noted that, in order to prevent damage to switch 7, a device for cooling switch 7 (such as a cooling fan or a cooling fin) is required, which may cause an increase in the size of the device.

Accordingly, when load 1A switches from the power running operation to the regenerative operation, converter control circuit 16 first turns on switch 7. Thereby, switching from power feeding by diode rectifier 12 to power collection by converter 5 can be performed uninterruptibly. Then, when the regenerative operation continues for more than the set time, converter control circuit 16 turns off switch 7 to protect switch 7, and shifts to power collection using switch 18. It should be noted that the set time (set value CNT) can be set based on the magnitude of a current flowing to switch 7 during the regenerative operation, an allowable current of switch 7, and the like.

Figure 10:
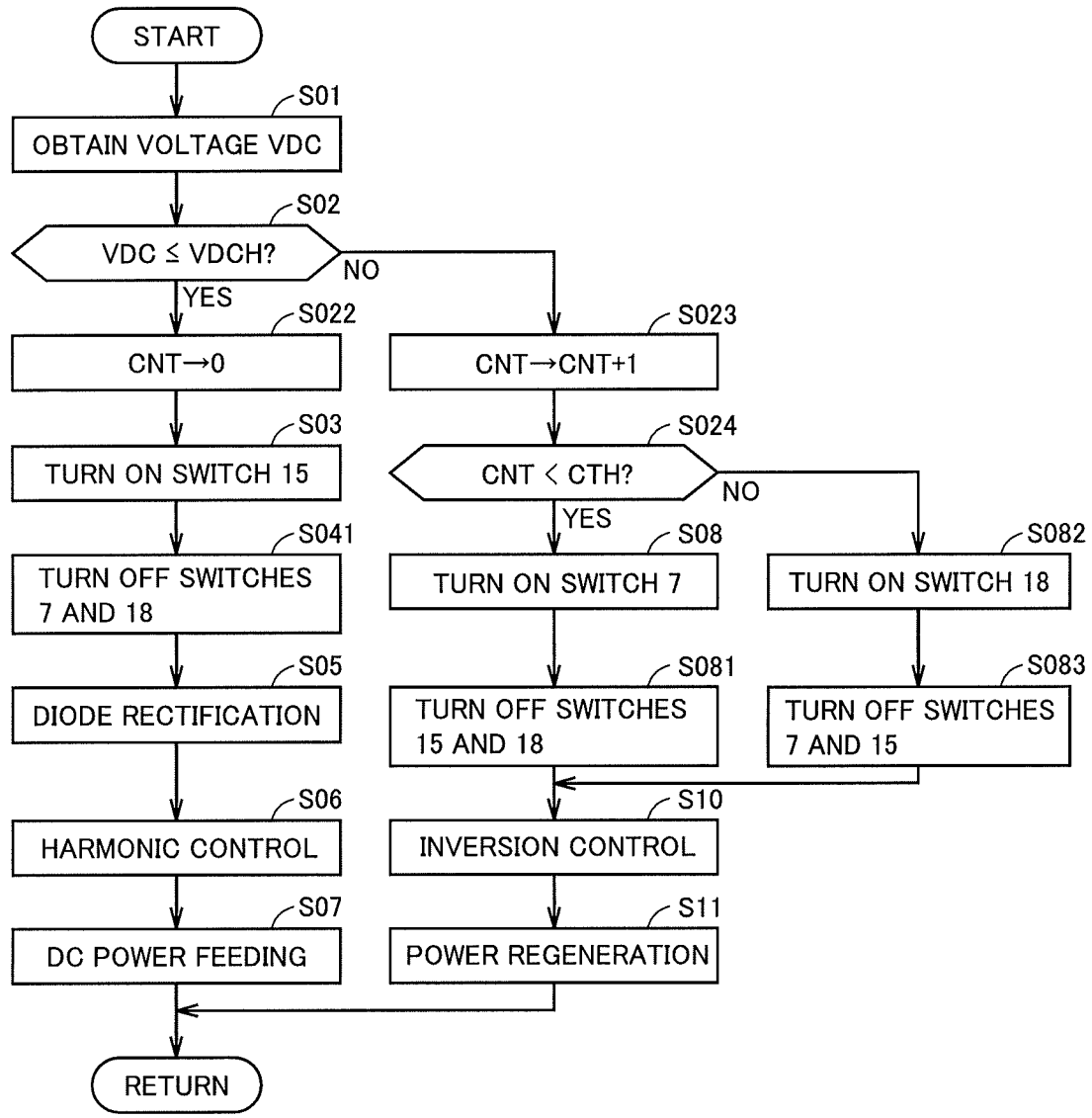
FIG. 10 is a flowchart for illustrating control performed by a converter control circuit.

FIG. 10 is a flowchart for illustrating control performed by converter control circuit 16 shown in FIG. 9. The flowchart shown in FIG. 10 additionally includes processing in steps S022 to S024, S041, and S081 to S083, relative to the flowchart shown in FIG. 6.

Referring to FIG. 10, in step S01, converter control circuit 16 obtains voltage VDC of DC bus 8 based on the output signals of voltage detectors 24 and 26. In step S02, converter control circuit 16 determines whether load 1A is performing the power running operation or the regenerative operation based on voltage VDC.

In the case of VDC≤VDCH (YES in S02), converter control circuit 16 determines that load 1A is performing the power running operation. In this case, in step S022, converter control circuit 16 sets count value CNT of the timer to the initial value "0".

Then, converter control circuit 16 turns on switch 15 in step S03, and turns off switches 7 and 18 in step S041. As a result, in step S05, the AC power supplied from AC power supply 1 is converted into DC power by diode rectifier 12.

In step S06, converter control circuit 16 instructs switching circuit 62 (FIG. 5) to output the control signal generated by harmonic controller 30. Thereby, in step S07, the DC power generated by diode rectifier 12 is supplied to load 1A.

In contrast, in the case of VDC>VDCH (NO in S02), converter control circuit 16 determines that load 1A is performing the regenerative operation. In this case, in step S023, converter control circuit 16 increments count value CNT of the timer (adds "1" to count value CNT).

In step S024, converter control circuit 16 determines whether count value CNT of the timer reaches set value CTH. When count value CNT is smaller than set value CTH (YES in S024), converter control circuit 16 determines that the regenerative operation time does not reach the set time. Converter control circuit 16 places switch 7 in an ON state in step S08, and places switches 15 and 18 in an OFF state in step S081.

In contrast, when count value CNT of the timer is more than or equal to set value CTH in step S024 (NO in S024), converter control circuit 16 determines that the regenerative operation time reaches the set time. Converter control circuit 16 places switch 18 in an ON state in step S082, and places switches 7 and 15 in an OFF state in step S083.

In step S10, converter control circuit 16 instructs switching circuit 62 to output the control signal generated by power conversion controller 40. As a result, in step S11, the regenerative power generated in load 1A is converted into AC power by converter 5, and is returned to AC power supply 1.

As described above, the uninterruptible power supply device in accordance with the third embodiment can achieve the same effect as that of the uninterruptible power supply device in accordance with the first embodiment. Further, since the uninterruptible power supply device can protect the semiconductor switch for uninterruptibly switching from power feeding by the diode rectifier to power collection by the converter, the uninterruptible power supply device can have an improved reliability.

Fourth Embodiment

Figure 11:
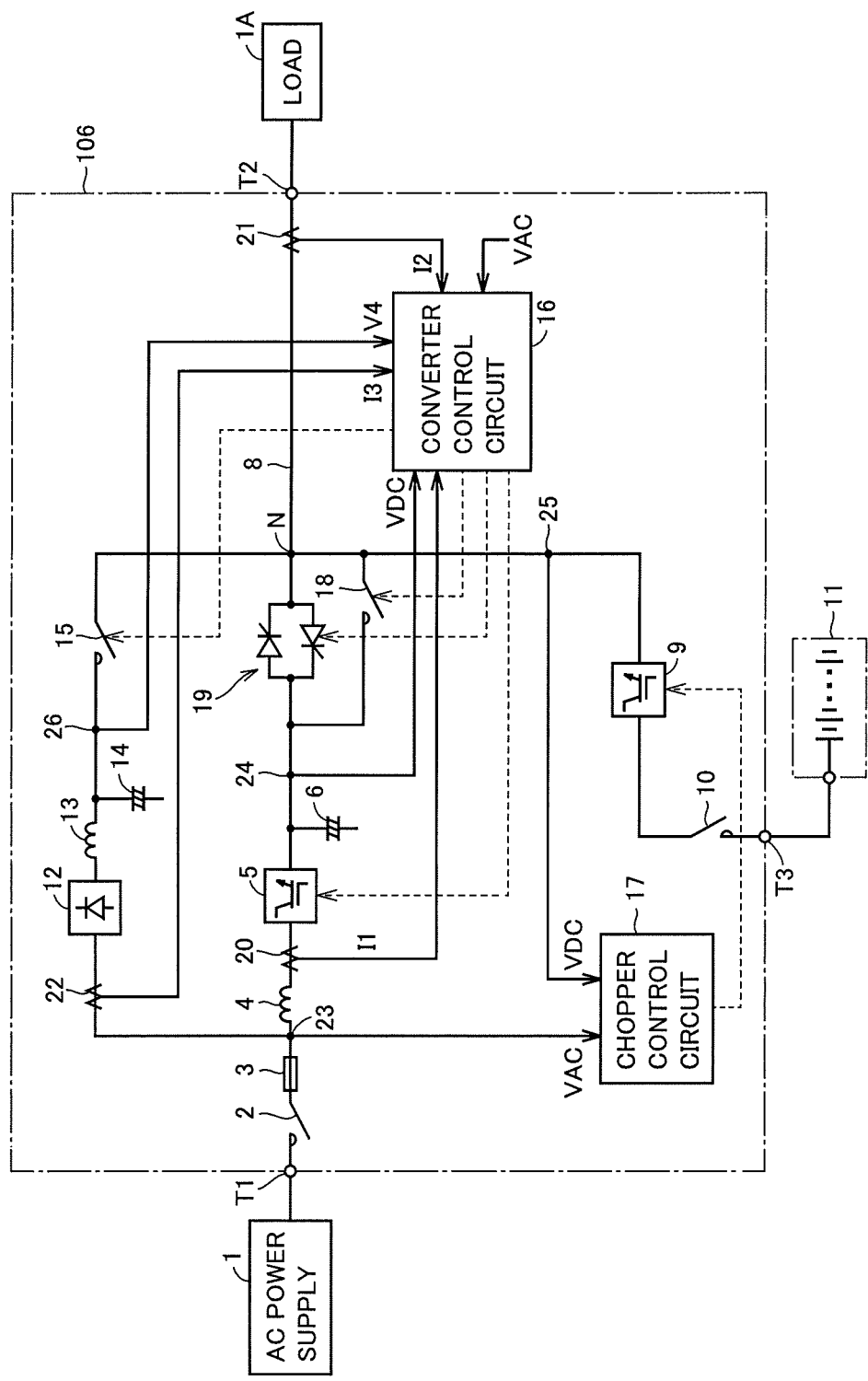
FIG. 11 is a circuit block diagram showing a configuration of an uninterruptible power supply device in accordance with a fourth embodiment of the present invention.

FIG. 11 is a circuit block diagram showing a configuration of an uninterruptible power supply device 106 in accordance with a fourth embodiment of the present invention. Referring to FIG. 11, uninterruptible power supply device 106 in accordance with the fourth embodiment is different from uninterruptible power supply device 100 in accordance with the first embodiment shown in FIG. 1 in that uninterruptible power supply device 106 includes a parallel circuit including switches 18 and 19, instead of switch 7.

Switch 19 is a semiconductor switch having two thyristor switches. The two thyristor switches are connected in antiparallel with each other. Switch 18 is connected in parallel to switch 19. Switch 18 is a mechanical switch such as a contactor, for example. The parallel circuit including switches 18 and 19 corresponds to one embodiment of the "first switch".

When an abnormality occurs in diode rectifier 12 during the power running operation of load 1A, power feeding to load 1A is cut off. Uninterruptible power supply device 106 in accordance with the fourth embodiment is configured such that, when an abnormality in diode rectifier 12 is detected, uninterruptible power supply device 106 switches from power feeding by diode rectifier 12 to power feeding by converter 5.

Figure 12:
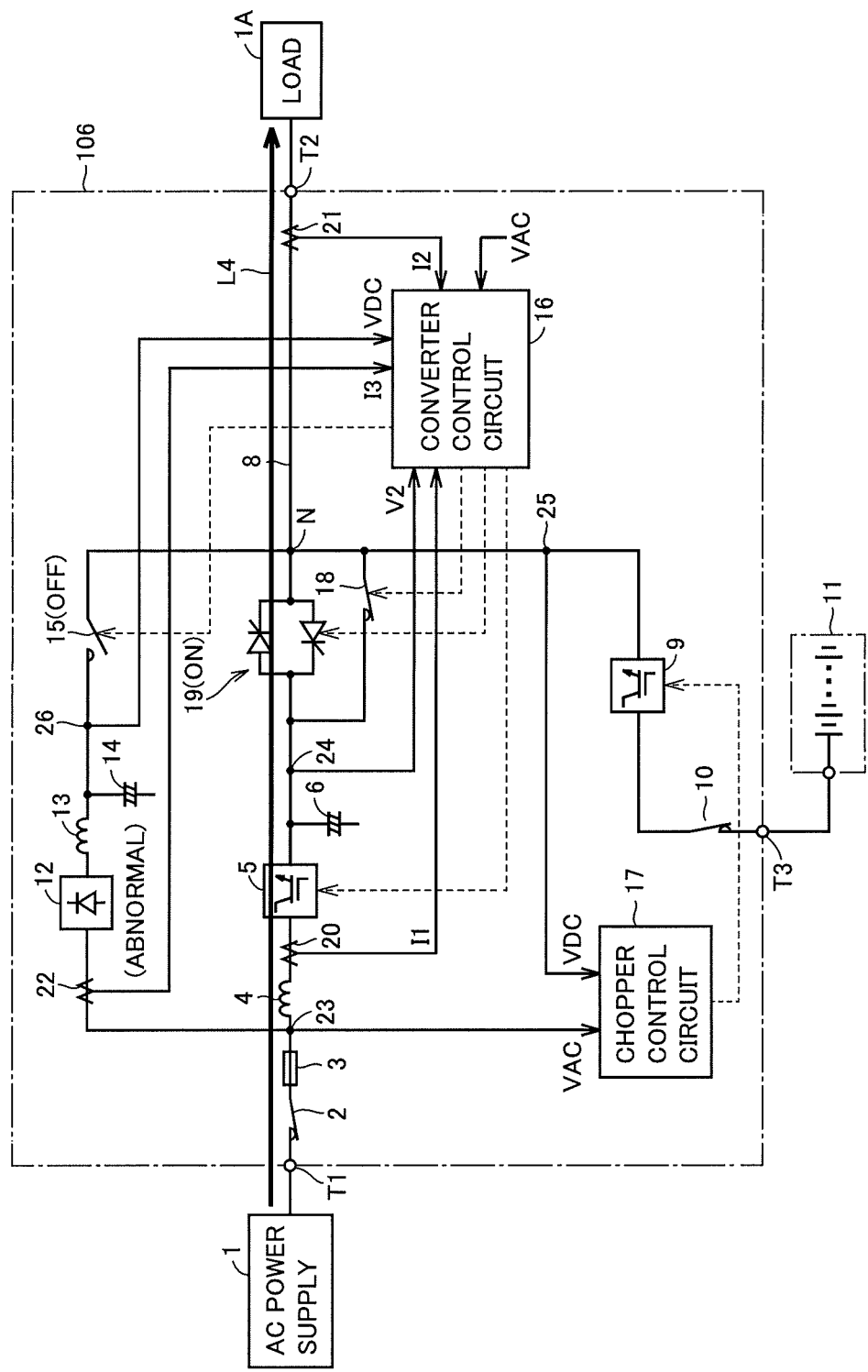
FIG. 12 is a view showing a flow of power when an abnormality occurs in a diode rectifier.

FIG. 12 is a view showing a flow of power when an abnormality occurs in diode rectifier 12. In FIG. 12, the flow of power is indicated by an arrow L4.

Referring to FIG. 12, during the power running operation of load 1A, converter control circuit 16 determines whether or not diode rectifier 12 is normal, based on at least one of the output signals of current detector 22 and voltage detector 26. For example, when current I3 flowing between AC power supply 1 and diode rectifier 12 exceeds a predetermined upper limit current, converter control circuit 16 determines that an abnormality occurs in diode rectifier 12.

When an abnormality occurs in diode rectifier 12 during the power running operation of load 1A, converter control circuit 16 turns on switches 18 and 19 and turns off switch 15. Thereby, instead of diode rectifier 12, converter 5 is electrically connected between AC power supply 1 and output terminal T2. First, switch 19 is turned on to start power feeding by converter 5. Then, switch 18 is turned on and switch 15 is turned off, and thereby switching is completed.

Converter control circuit 16 controls converter 5 to convert the AC power supplied from AC power supply 1 into DC power. Converter control circuit 16 controls converter 5 such that voltage VDC of DC bus 8 becomes equal to reference voltage VDCR. As a result, as shown in FIG. 12, the DC power generated by converter 5 is supplied to load 1A. In the case of power feeding to load 1A using converter 5, voltage VDC of DC bus 8 can be controlled to an arbitrary voltage, unlike in the case of power feeding to load 1A using diode rectifier 12. Therefore, reference voltage VDCR can be set to a voltage higher than the DC voltage output by diode rectifier 12. For example, when the output AC voltage of AC power supply 1 is 400 V, the output DC voltage of diode rectifier 12 is about 566 V. In this case, reference voltage VDCR can be set to a voltage higher than 566 V, for example, 700 V.

Figure 13:
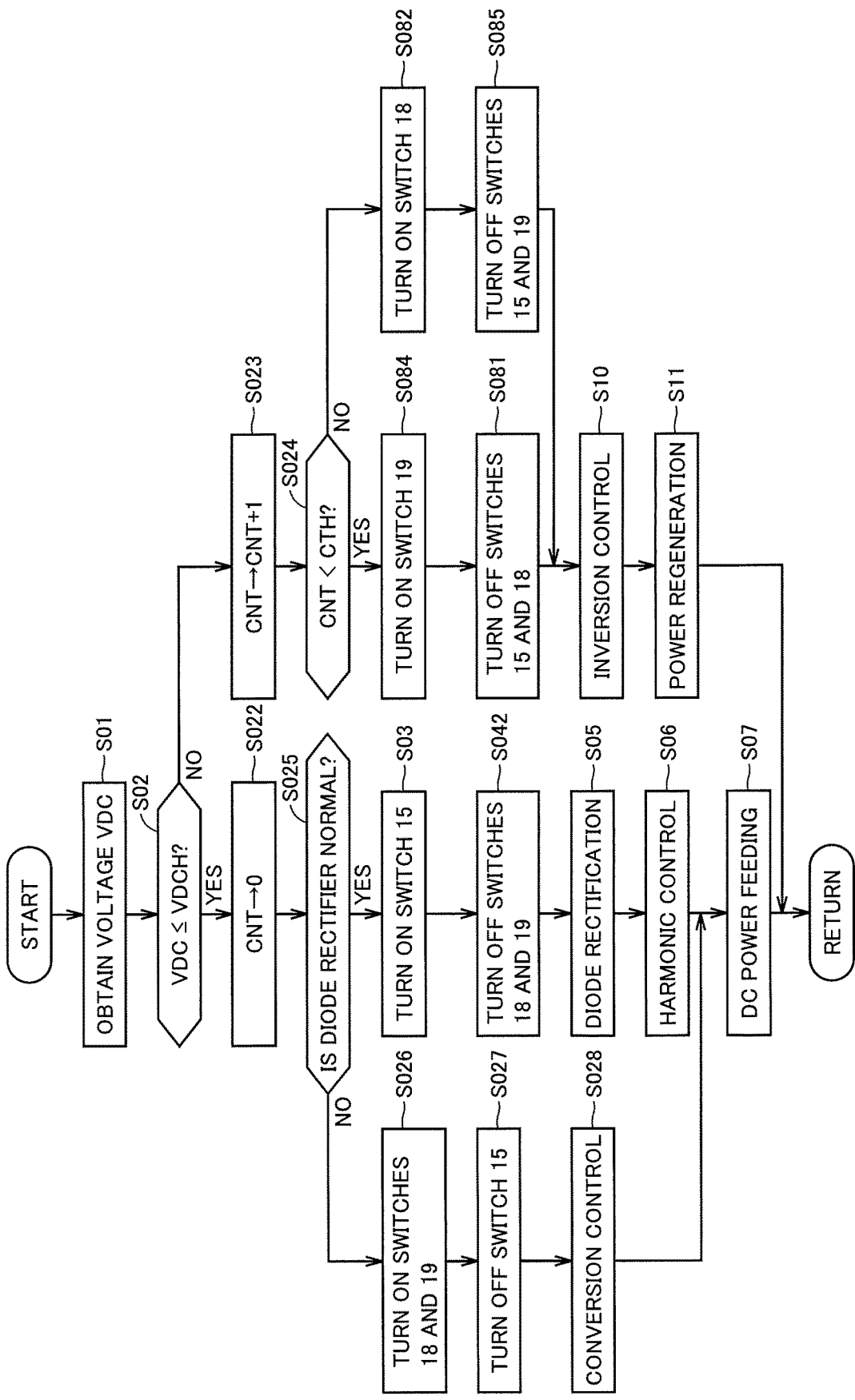
FIG. 13 is a flowchart for illustrating control performed by a converter control circuit.

FIG. 13 is a flowchart for illustrating control performed by converter control circuit 16 shown in FIG. 11. The flowchart shown in FIG. 13 additionally includes processing in steps S022 to S028, S042, S081, S082, S084, and S085, relative to the flowchart shown in FIG. 6.

Referring to FIG. 13, when converter control circuit 16 obtains voltage VDC of DC bus 8 in step S01, converter control circuit 16 determines in step S02 whether load 1A is performing the power running operation or the regenerative operation based on voltage VDC.

In the case of VDC≤VDCH (YES in S02), converter control circuit 16 determines that load 1A is performing the power running operation. In this case, in step S022, converter control circuit 16 sets count value CNT of the timer to the initial value "0".

Then, in step S025, converter control circuit 16 determines whether or not diode rectifier 12 is normal, based on at least one of the output signals of current detector 22 and voltage detector 26. When converter control circuit 16 determines that diode rectifier 12 is normal (YES in S025), converter control circuit 16 turns on switch 15 in step S03, and turns off switches 18 and 19 in step S042.

When switch 15 is turned on, in step S05, diode rectifier 12 converts the AC power supplied from AC power supply 1 into DC power. In step S06, converter control circuit 16 instructs switching circuit 62 (FIG. 5) to output the control signal generated by harmonic controller 30. As a result, in step S07, the DC power generated by diode rectifier 12 is supplied to load 1A. On this occasion, on the AC side of diode rectifier 12, the harmonic is suppressed and the power factor is improved by converter 5.

When converter control circuit 16 determines that an abnormality occurs in diode rectifier 12 (NO in S025), converter control circuit 16 turns on switches 18 and 19 in step S026, and turns off switch 15 in step S027. In step S028, converter control circuit 16 further controls converter 5 to convert the AC power supplied from AC power supply 1 into DC power (conversion). Thereby, in step S07, the DC power generated by converter 5 is supplied to load 1A.

In contrast, in the case of VDC>VDCH (NO in S02), converter control circuit 16 determines that load 1A is performing the regenerative operation. In this case, in step S023, converter control circuit 16 increments count value CNT of the timer (adds "1" to count value CNT).

In step S024, converter control circuit 16 determines whether count value CNT of the timer reaches set value CTH. When count value CNT is smaller than set value CTH (YES in S024), converter control circuit 16 determines that the regenerative operation time does not reach the set time. Converter control circuit 16 places switch 19 in an ON state in step S084, and places switches 15 and 18 in an OFF state in step S081.

In contrast, when count value CNT of the timer is more than or equal to set value CTH in step S024 (NO in S024), converter control circuit 16 determines that the regenerative operation time reaches the set time. Converter control circuit 16 places switch 18 in an ON state in step S082, and places switches 15 and 19 in an OFF state in step S085.

In step S10, converter control circuit 16 instructs switching circuit 62 to output the control signal generated by power conversion controller 40. As a result, in step S11, the regenerative power generated in load 1A is converted into AC power by converter 5, and is returned to AC power supply 1.

As described above, the uninterruptible power supply device in accordance with the fourth embodiment can achieve the same effect as that of the uninterruptible power supply device in accordance with the first embodiment. Further, even when an abnormality occurs in the diode rectifier, DC power can be supplied to the load using the converter. Furthermore, the uninterruptible power supply device can protect the semiconductor switch for uninterruptibly switching from power feeding by the diode rectifier to power collection by the converter. Therefore, the uninterruptible power supply device can have an improved reliability.

It should be noted that, in the present embodiment, the description has been given of a configuration in which, when an abnormality occurs in diode rectifier 12, switches 18 and 19 are turned on to supply the DC power generated by converter 5 to load 1A. However, when the power running operation of load 1A continues for more than the set time, it is possible to turn off switch 19 to protect switch 19, and shift to power feeding using switch 18. The set time can be set based on the magnitude of a current flowing to switch 19 during the power running operation, an allowable current of switch 19, and the like.

Fifth Embodiment

Figure 14:
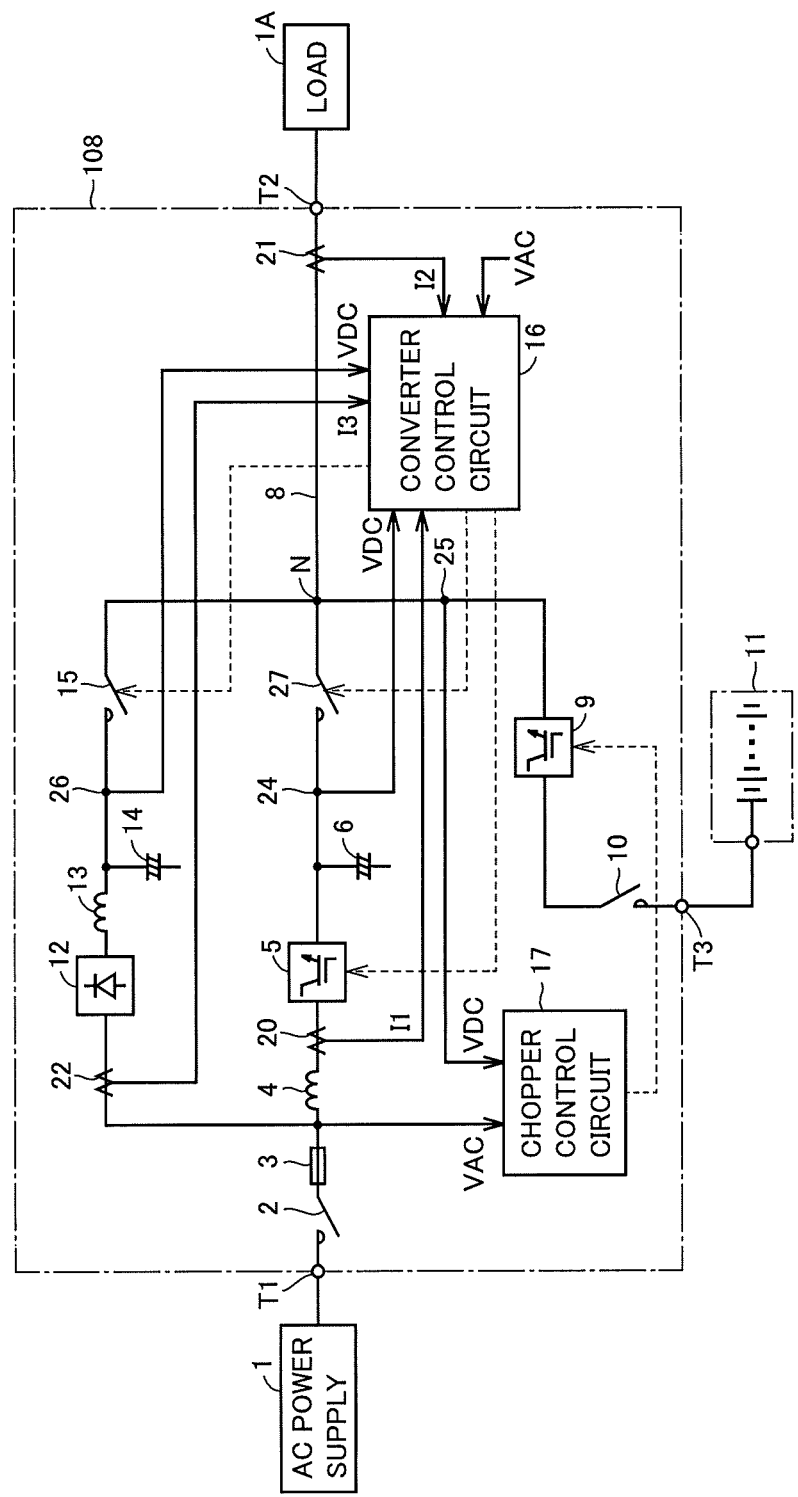
FIG. 14 is a circuit block diagram showing a configuration of an uninterruptible power supply device in accordance with a fifth embodiment of the present invention.

FIG. 14 is a circuit block diagram showing a configuration of an uninterruptible power supply device 108 in accordance with a fifth embodiment of the present invention. Referring to FIG. 14, uninterruptible power supply device 108 in accordance with the fifth embodiment is different from uninterruptible power supply device 100 in accordance with the first embodiment shown in FIG. 1 in that uninterruptible power supply device 108 includes a switch 27, instead of switch 7.

Switch 27 is a mechanical switch such as a contactor, for example. Switch 27 corresponds to one embodiment of the "first switch". When an abnormality occurs in diode rectifier 12 during the power running operation of load 1A, converter control circuit 16 turns on switch 27 and turns off switch 15. Thereby, instead of diode rectifier 12, converter 5 is electrically connected between AC power supply 1 and output terminal T2.

Further, when load 1A switches from the power running operation to the regenerative operation during power feeding from diode rectifier 12, converter control circuit 16 turns on switch 27 and turns off switch 15.

In uninterruptible power supply device 108 in accordance with the fifth embodiment, since both switches 15 and 27 are mechanical switches, a loss occurring in these switches can be reduced. On the other hand, it may be difficult to uninterruptibly switch between power feeding by diode rectifier 12 and power feeding by converter 5. The same applies to switching from power feeding by diode rectifier 12 to power regeneration by converter 5. Uninterruptible power supply device 108 in accordance with the fifth embodiment is applicable to a load which is allowed to stop at the time of switching.

Figure 15:
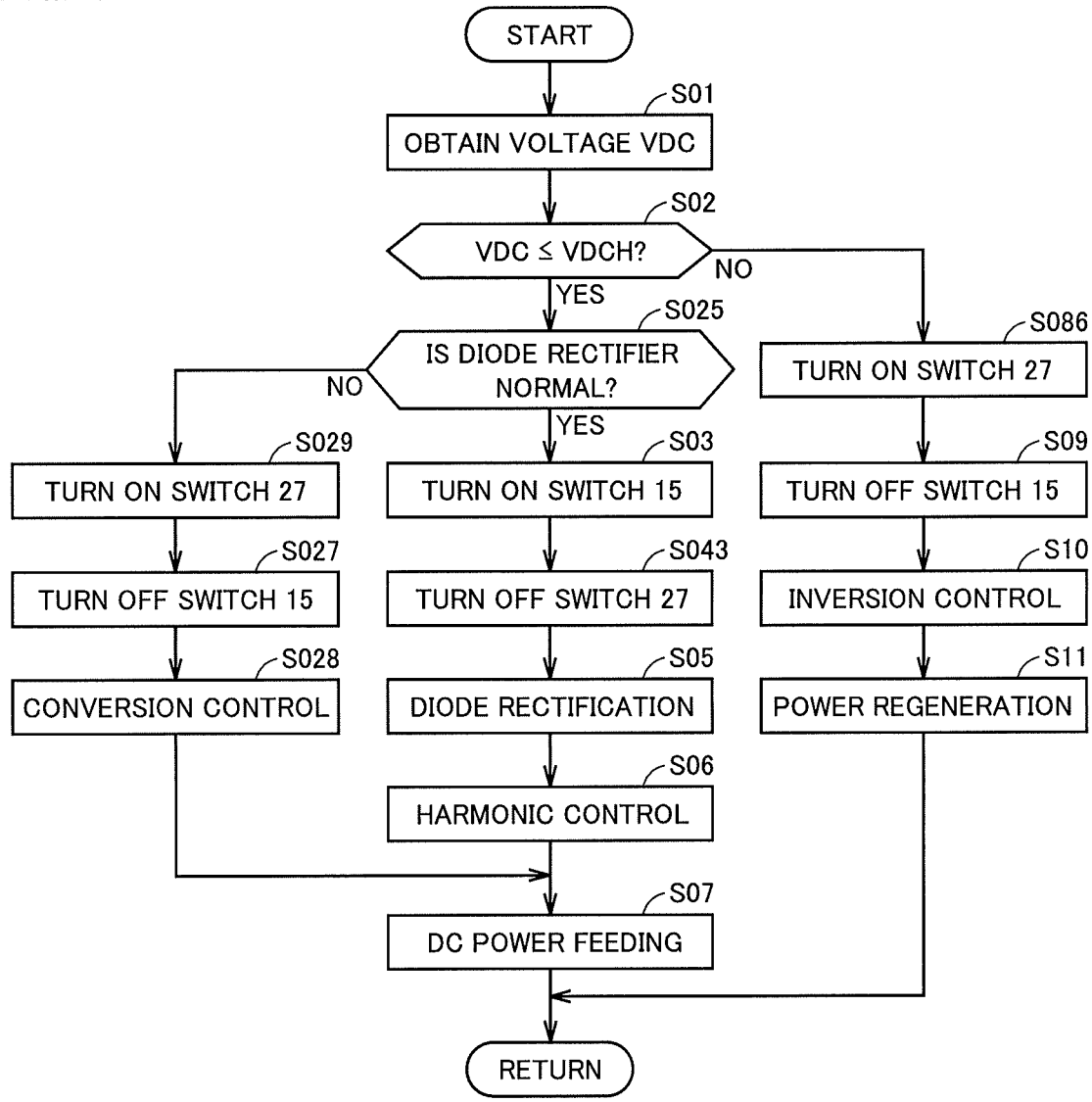
FIG. 15 is a flowchart for illustrating control performed by a converter control circuit.

FIG. 15 is a flowchart for illustrating control performed by converter control circuit 16 shown in FIG. 14. The flowchart shown in FIG. 15 additionally includes steps S025 and S027 to S029 relative to the flowchart shown in FIG. 6, and includes steps S043 and S086 instead of steps S04 and S08, respectively.

Referring to FIG. 15, when converter control circuit 16 obtains voltage VDC of DC bus 8 in step S01, converter control circuit 16 determines in step S02 whether load 1A is performing the power running operation or the regenerative operation based on voltage VDC.

In the case of VDC≤VDCH (YES in S02), converter control circuit 16 determines that load 1A is performing the power running operation. Then, in step S025, converter control circuit 16 determines whether or not diode rectifier 12 is normal, based on at least one of the output signals of current detector 22 and voltage detector 26.

When converter control circuit 16 determines that diode rectifier 12 is normal (YES in S025), converter control circuit 16 turns on switch 15 in step S03, and turns off switch 27 in step S043.

When switch 15 is turned on, in step S05, diode rectifier 12 converts the AC power supplied from AC power supply 1 into DC power. In step S06, converter control circuit 16 instructs switching circuit 62 (FIG. 5) to output the control signal generated by harmonic controller 30. As a result, in step S07, the DC power generated by diode rectifier 12 is supplied to load 1A. On this occasion, on the AC side of diode rectifier 12, the harmonic is suppressed and the power factor is improved by converter 5.

When converter control circuit 16 determines that an abnormality occurs in diode rectifier 12 (NO in S025), converter control circuit 16 turns on switch 27 in step S029, and turns off switch 15 in step S027. In step S028, converter control circuit 16 further controls converter 5 to convert the AC power supplied from AC power supply 1 into DC power. Thereby, in step S07, the DC power generated by converter 5 is supplied to load 1A.

In contrast, in the case of VDC>VDCH (NO in S02), converter control circuit 16 determines that load 1A is performing the regenerative operation. In this case, converter control circuit 16 places switch 27 in an ON state in step S086, and places switch 15 in an OFF state in step S09.

In step S10, converter control circuit 16 instructs switching circuit 62 to output the control signal generated by power conversion controller 40. As a result, in step S11, the regenerative power generated in load 1A is converted into AC power by converter 5, and is returned to AC power supply 1.

As described above, the uninterruptible power supply device in accordance with the fifth embodiment can achieve the same effect as that of the uninterruptible power supply device in accordance with the first embodiment. Further, even when an abnormality occurs in the diode rectifier, DC power can be supplied to the load using the converter, and thus the uninterruptible power supply device can have an improved reliability.

It should be understood that the embodiments disclosed herein are illustrative, and are not limited to the contents described above. The scope of the present invention is defined by the scope of the claims, and is intended to include any modifications within the scope and meaning equivalent to the scope of the claims.

REFERENCE SIGNS LIST

1: AC power supply; 1A: load; 2, 7, 10, 15, 27: switch; 3: fuse; 4, 13: reactor; 5, 14: converter; 6: capacitor; 8: DC bus; 9: bidirectional chopper; 11: storage battery; 12: diode rectifier; 16: converter control circuit; 17: chopper control circuit; 20 to 22: current detector; 24 to 26: voltage detector; 30: harmonic control; 31: filter; 32, 36, 41, 43, 46, 48: subtractor; 33, 49: current controller; 37, 47: voltage controller; 34: adder; 35, 45: PWM controller; 40: power conversion controller; 44, 51: coordinate converter; 50: adder; 52: computing unit; 53: PLL unit; 60: switching controller; 62: switching circuit; 100, 102, 104, 106, 108: uninterruptible power supply device; T1: input terminal; T2: output terminal; T3: battery terminal.

The invention claimed is:

1. An uninterruptible power supply device for supplying DC power to a load, comprising:
a DC bus connected to the load;
a converter connected between an AC power supply and the DC bus;
a diode rectifier connected between the AC power supply and the DC bus, in parallel to the converter;
a DC/DC converter configured to perform DC voltage conversion between the DC bus and a power storage device for storing DC power;
a first switch electrically connected between the converter and the DC bus;
a second switch electrically connected between the diode rectifier and the DC bus; and
a control device configured to control the converter, the DC/DC converter, and the first and second switches,
the control device being configured to
when the load is performing a power running operation, turn on the second switch to supply DC power from the diode rectifier to the load, turn off the first switch, and control the converter to suppress a harmonic current contained in an AC current flowing from the AC power supply to the diode rectifier, and
when the load is performing a regenerative operation, turn off the second switch, turn on the first switch, and control the converter to convert regenerative power generated by the load into AC power, wherein the uninterruptible power supply device further comprises:
a voltage detector configured to detect a voltage of the DC bus, wherein the control device is configured to determine, based on a detection value of the voltage detector, whether the load is performing the power running operation or the regenerative operation and wherein the control device includes:
a first controller configured to generate a first control signal for outputting a compensation current from the converter, the compensation current having a phase opposite to that of the harmonic current,
a second controller configured to generate a second control signal for matching the voltage of the DC bus to a reference voltage, and
a third controller configured to turn on/off the first and second switches, and to switch between the first and second control signals and output selectively one of the first and second control signals to the converter, based on a result of determining whether the load is performing the power running operation or the regenerative operation.

2. The uninterruptible power supply device according to claim 1, wherein, when AC power is not normally supplied from the AC power supply, the control device is configured to turn off the first and the second switches, and control the DC/DC converter to supply the DC power in the power storage device to the DC bus.

3. The uninterruptible power supply device according to claim 1, further comprising a current detector configured to detect a current flowing to the load, wherein the control device is configured to determine, based on a detection value of the current detector, whether the load is performing the power running operation or the regenerative operation.

4. The uninterruptible power supply device according to claim 1, wherein the first switch includes a semiconductor switch configured to allow a current to flow from the DC bus to the converter, in an ON state.

5. The uninterruptible power supply device according to claim 4, wherein the first switch further includes a mechanical switch connected in parallel to the semiconductor switch.

6. The uninterruptible power supply device according to claim 5, wherein, when the load switches from the power running operation to the regenerative operation, the control device is configured to turn on the semiconductor switch, and
when the regenerative operation continues for more than a set time, the control device is configured to turn on the mechanical switch and turn off the semiconductor switch.

7. The uninterruptible power supply device according to claim 1, wherein the first switch has a semiconductor switch having two semiconductor elements connected in anti-parallel with each other, and a mechanical switch connected in parallel to the semiconductor switch.

8. The uninterruptible power supply device according to claim 7, wherein, when the diode rectifier becomes abnormal during the power running operation of the load, the control device is configured to turn on the semiconductor switch and the mechanical switch, turn off the second switch, and control the converter to convert AC power supplied from the AC power supply into DC power.

9. The uninterruptible power supply device according to claim 1, wherein the first switch is a mechanical switch.

10. The uninterruptible power supply device according to claim 9, wherein, when the diode rectifier becomes abnormal during the power running operation of the load, the control device is configured to turn on the mechanical switch, turn off the second switch, and control the converter to convert AC power supplied from the AC power supply into DC power.

11. An uninterruptible power supply device for supplying DC power to a load, comprising:
   a DC bus connected to the load;
   a converter connected between an AC power supply and the DC bus;
   a diode rectifier connected between the AC power supply and the DC bus, in parallel to the converter;
   a DC/DC converter configured to perform DC voltage conversion between the DC bus and a power storage device for storing DC power;
   a first switch electrically connected between the converter and the DC bus;
   a second switch electrically connected between the diode rectifier and the DC bus; and
   a control device configured to control the converter, the DC/DC converter, and the first and second switches,
   the control device being configured to
      when the load is performing power running operation, turn on the second switch to supply DC power from the diode rectifier to the load, turn off the first switch, and control the converter to suppress a harmonic current contained in an AC current flowing from the AC power supply to the diode rectifier, and
      when the load is performing regenerative operation, turn off the second switch, turn on the first switch, and control the converter to convert regenerative power generated by the load into AC power,
   wherein the first switch includes a semiconductor switch configured to allow a current to flow from the DC bus to the converter, in an ON state, and
   wherein the first switch further includes a mechanical switch connected in parallel to the semiconductor switch.

12. An uninterruptible power supply device for supplying DC power to a load, comprising:
   a DC bus connected to the load;
   a converter connected between an AC power supply and the DC bus;
   a diode rectifier connected between the AC power supply and the DC bus, in parallel to the converter;
   a DC/DC converter configured to perform DC voltage conversion between the DC bus and a power storage device for storing DC power;
   a first switch electrically connected between the converter and the DC bus;
   a second switch electrically connected between the diode rectifier and the DC bus; and
   a control device configured to control the converter, the DC/DC converter, and the first and second switches,
   the control device being configured to
      when the load is performing power running operation, turn on the second switch to supply DC power from the diode rectifier to the load, turn off the first switch, and control the converter to suppress a harmonic current contained in an AC current flowing from the AC power supply to the diode rectifier, and
      when the load is performing regenerative operation, turn off the second switch, turn on the first switch, and control the converter to convert regenerative power generated by the load into AC power,
   wherein the first switch has a semiconductor switch having two semiconductor elements connected in anti-parallel with each other, and a mechanical switch connected in parallel to the semiconductor switch.

13. An uninterruptible power supply device for supplying DC power to a load, comprising:
   a DC bus connected to the load;
   a converter connected between an AC power supply and the DC bus;
   a diode rectifier connected between the AC power supply and the DC bus, in parallel to the converter;
   a DC/DC converter configured to perform DC voltage conversion between the DC bus and a power storage device for storing DC power;
   a first switch electrically connected between the converter and the DC bus;
   a second switch electrically connected between the diode rectifier and the DC bus; and
   a control device configured to control the converter, the DC/DC converter, and the first and second switches,
   the control device being configured to
      when the load is performing power running operation, turn on the second switch to supply DC power from the diode rectifier to the load, turn off the first switch, and control the converter to suppress a harmonic current contained in an AC current flowing from the AC power supply to the diode rectifier, and
      when the load is performing regenerative operation, turn off the second switch, turn on the first switch, and control the converter to convert regenerative power generated by the load into AC power,
   wherein the first switch is a mechanical switch.

14. The uninterruptible power supply device according to claim 13, wherein the first switch includes a semiconductor switch configured to allow a current to flow from the DC bus to the converter, in an ON state.

15. The uninterruptible power supply device according to claim 14, wherein the first switch further includes a mechanical switch connected in parallel to the semiconductor switch.

16. The uninterruptible power supply device according to claim 15, wherein, when the load switches from the power running operation to the regenerative operation, the control device is configured to turn on the semiconductor switch, and
   when the regenerative operation continues for more than a set time, the control device is configured to turn on the mechanical switch and turn off the semiconductor switch.

17. The uninterruptible power supply device according to claim 13, wherein the first switch has a semiconductor switch having two semiconductor elements connected in anti-parallel with each other, and a mechanical switch connected in parallel to the semiconductor switch.

18. The uninterruptible power supply device according to claim 17, wherein, when the diode rectifier becomes abnormal during the power running operation of the load, the control device is configured to turn on the semiconductor switch and the mechanical switch, turn off the second switch, and control the converter to convert AC power supplied from the AC power supply into DC power.

* * * * *